(12) United States Patent
Khire et al.

(10) Patent No.: US 11,936,698 B2
(45) Date of Patent: Mar. 19, 2024

(54) SYSTEMS AND METHODS FOR ADAPTIVE VIDEO CONFERENCING

(71) Applicant: Verizon Patent and Licensing Inc., Basking Ridge, NJ (US)

(72) Inventors: Sourabh Khire, San Jose, CA (US); Nithin A. Prakash, San Jose, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 136 days.

(21) Appl. No.: 17/581,299

(22) Filed: Jan. 21, 2022

(65) Prior Publication Data
US 2023/0247069 A1 Aug. 3, 2023

(51) Int. Cl.
*H04N 19/14* (2014.01)
*H04L 65/403* (2022.01)
*H04N 19/42* (2014.01)

(52) U.S. Cl.
CPC ........... *H04L 65/403* (2013.01); *H04N 19/14* (2014.11); *H04N 19/42* (2014.11)

(58) Field of Classification Search
CPC ...... H04N 65/403; H04N 19/14; H04N 19/42; H04N 19/115; H04N 19/172; H04N 7/15; H04N 7/152
USPC ............................................ 348/14.01–14.16
See application file for complete search history.

(56) References Cited

U.S. PATENT DOCUMENTS

| | | | |
|---|---|---|---|
| 7,330,875 B1* | 2/2008 | Parasnis ............... | H04L 65/612 709/227 |
| 2007/0230565 A1* | 10/2007 | Tourapis .............. | H04N 19/107 375/E7.176 |
| 2016/0037128 A1* | 2/2016 | Van der Auwera ... | H04L 47/263 348/14.13 |
| 2018/0063480 A1* | 3/2018 | Luks ..................... | G06F 3/0484 |
| 2019/0261007 A1* | 8/2019 | Emmanuel ........ | H04W 52/0261 |
| 2021/0185313 A1* | 6/2021 | Ivanovic ................. | G06N 5/04 |
| 2021/0211768 A1* | 7/2021 | Zhong .............. | H04N 21/44218 |
| 2021/0399971 A1* | 12/2021 | Shiang ............... | H04N 21/2402 |
| 2022/0086393 A1* | 3/2022 | Peters .................... | G06V 20/41 |

* cited by examiner

*Primary Examiner* — Melur Ramakrishnaiah

(57) ABSTRACT

An illustrative video conference management system monitors an encoded video stream corresponding to an original real-time video stream of a video conference meeting. The video conference management system determines context data associated with one or more encoded video frames of the encoded video stream. The context data includes at least one of an encoder metric or a content attribute that indicates an encoding complexity level of the original real-time video stream. The video conference management system adjusts one or more encoded video streams corresponding to the original real-time video stream based on the context data. Corresponding methods and systems are also disclosed.

20 Claims, 9 Drawing Sheets

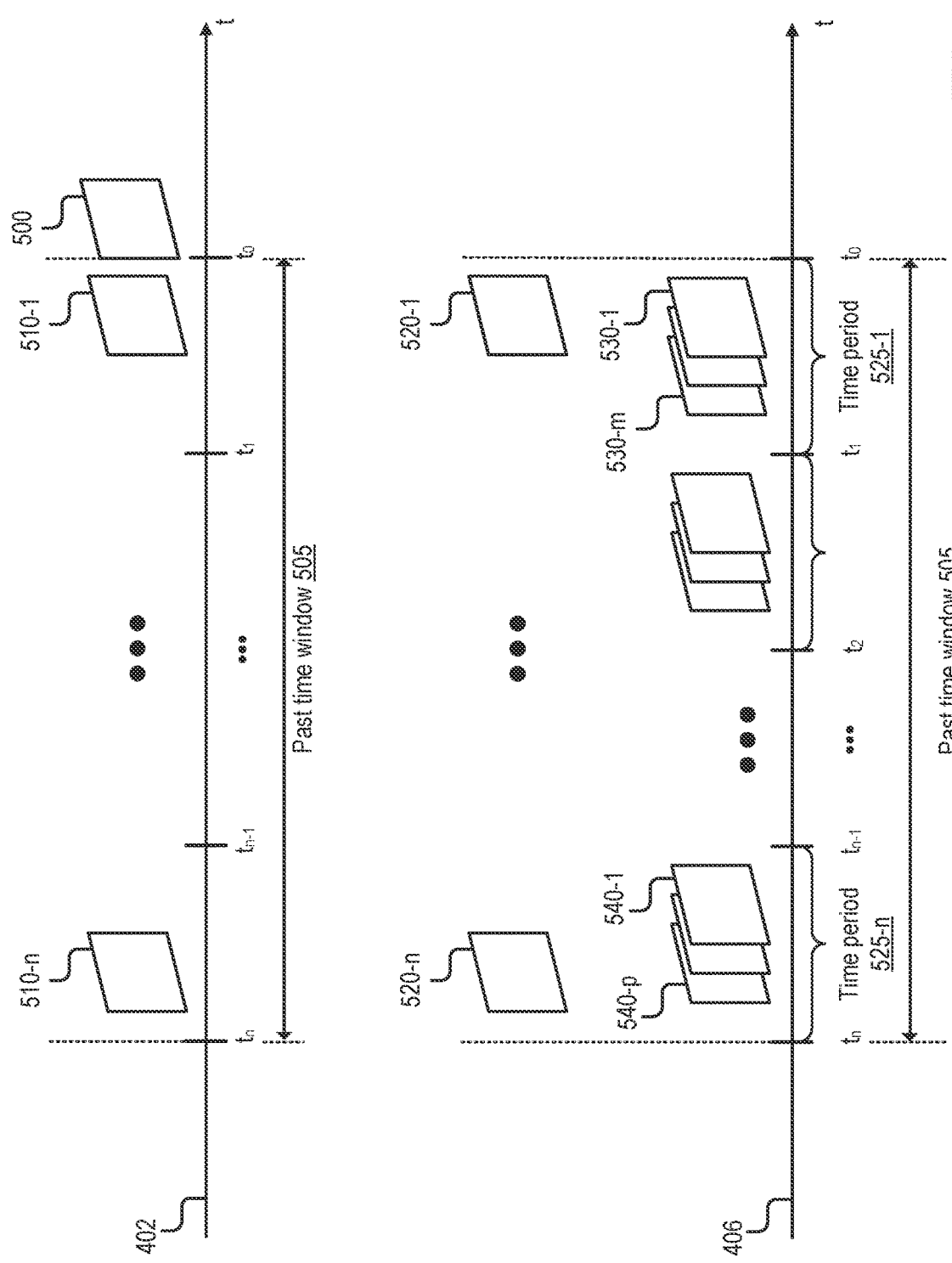

SYSTEMS AND METHODS FOR ADAPTIVE VIDEO CONFERENCING

BACKGROUND INFORMATION

A video conferencing application may provide bi-directional audio and video communication for participants of a video conference meeting. Because the participants of the video conference meeting communicate with one another in real-time, the video conferencing application may have a strict latency requirement. To satisfy the strict latency requirement, a video stream of a participant in the video conference meeting may need to be flexibly adjusted as a network condition associated with the participant may change over time. The adjustment of the video stream may also depend on device capability of a device on which the video conferencing application operates.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 5 shows an illustrative original real-time video stream and an illustrative encoded video stream according to embodiments described herein.

DETAILED DESCRIPTION OF EXAMPLE EMBODIMENTS

Methods and systems for adaptive video conferencing are described herein. In some embodiments, a video conference meeting may be a meeting, such as an online meeting, in which participants may use electronic devices to electronically participate from various locations. During the video conference meeting, the participants may interact with one another in real-time via bi-directional video and audio communication. The participants may also interact with one another via textual messages (e.g., chat) and/or content sharing (e.g., screen share) during the video conference meeting.

Figure 1A:
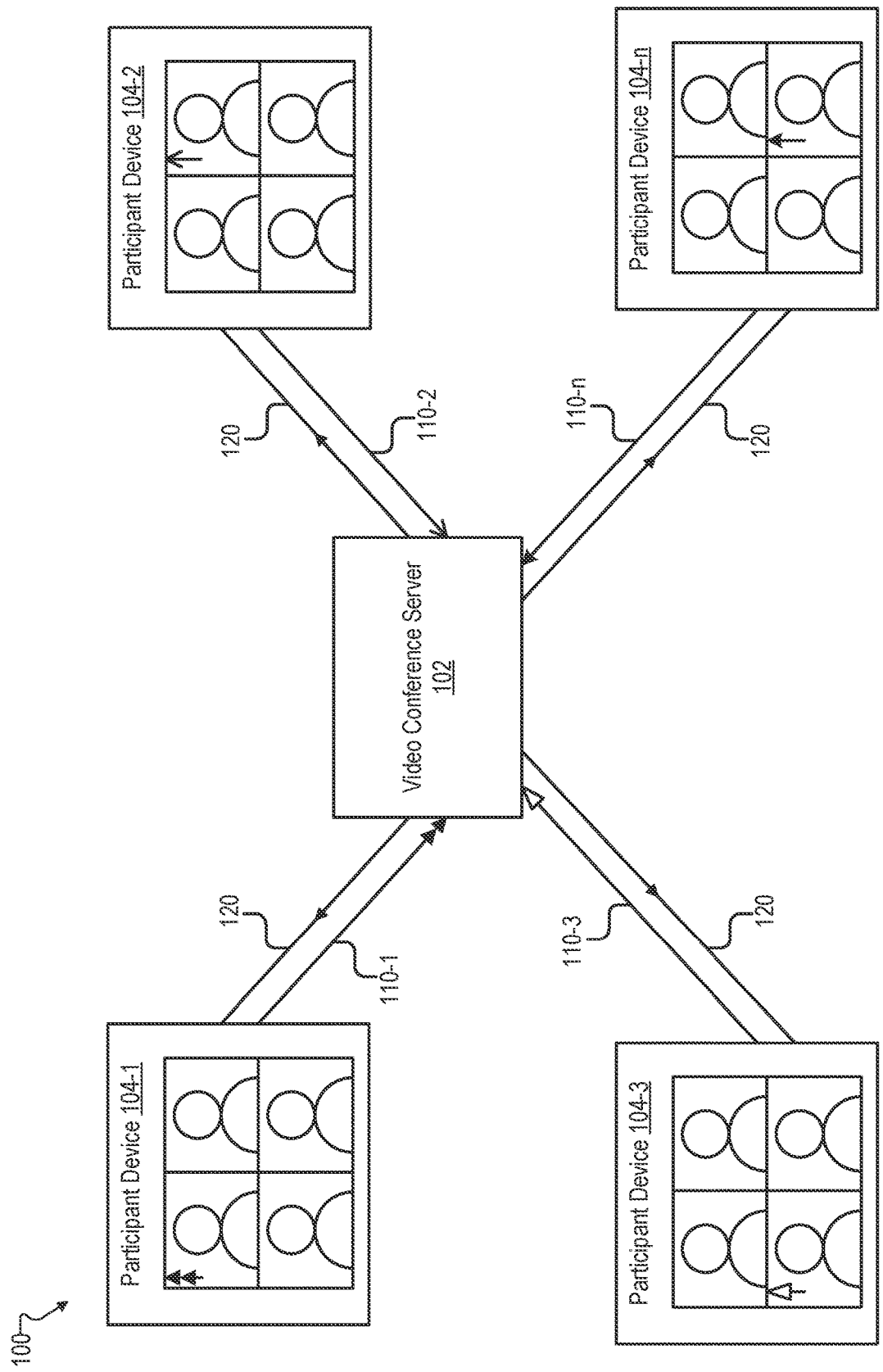
FIGS. 1A and 1B show illustrative video conferencing systems according to embodiments described herein.
Figure 1B:
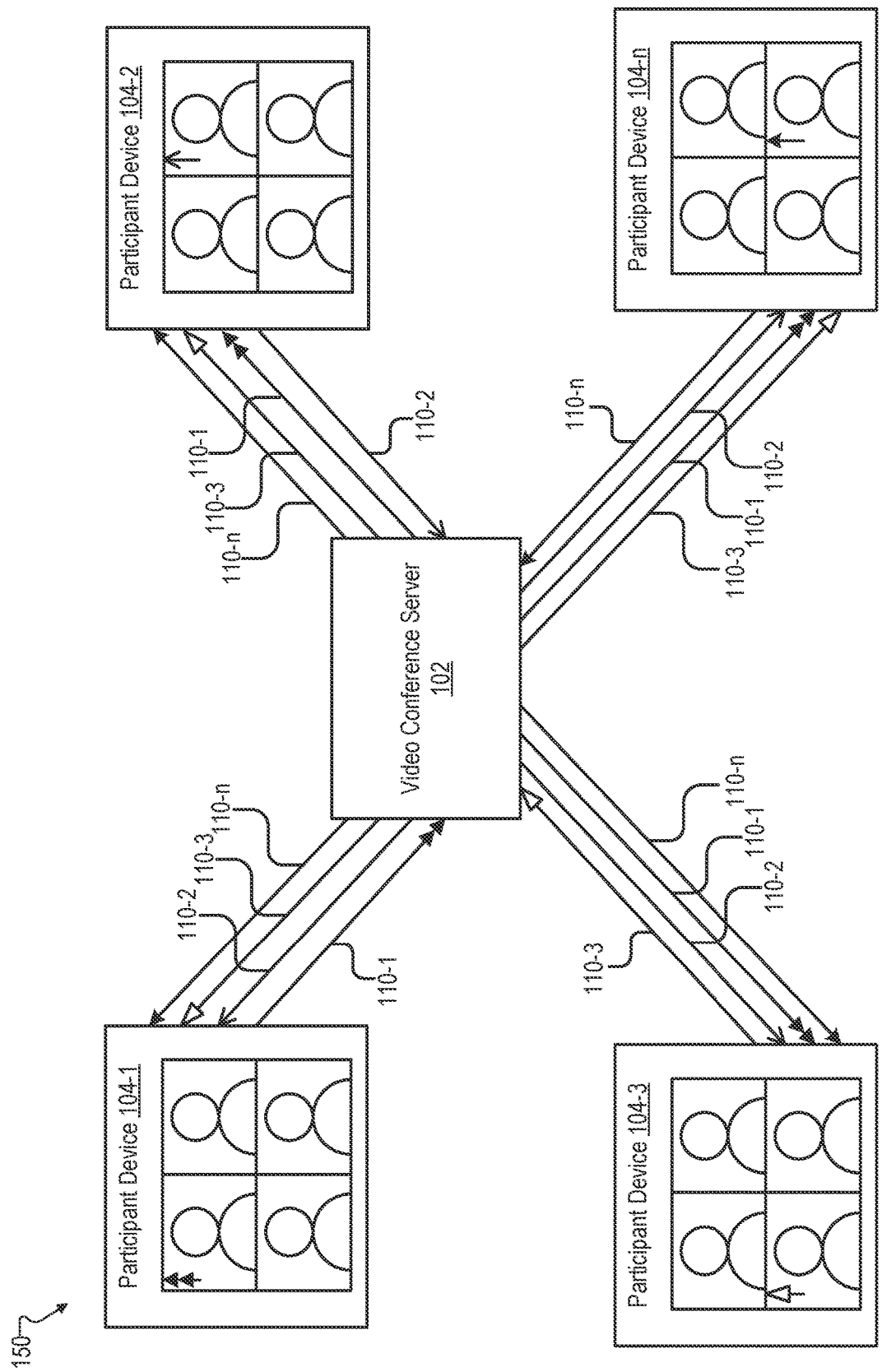

FIGS. 1A and 1B respectively show illustrative video conferencing systems 100 and 150 that enable a video conference meeting. As depicted in FIGS. 1A and 1B, video conferencing systems 100 and 150 may include a video conference server 102 and a plurality of participant devices 104-1 . . . 104-n (commonly referred to herein as participant device 104).

Participant device 104 may be a computing device (e.g., a personal computer, a mobile phone, a tablet, a laptop, etc.) associated with a participant of the video conference meeting. In some embodiments, participant device 104 may implement a video conference application and the participant may operate the video conference application on participant device 104 to electronically participate in the video conference meeting. To enable two-way communication between the participant and other participants of the video conference meeting, participant device 104 may include or may be communicatively coupled to one or more user interface devices (e.g., a display screen, a camera, a microphone, an audio speaker, etc.).

In some embodiments, the user interface devices may include one or more input devices (e.g., the camera, the microphone, etc.) that are used to capture video and/or audio of the participant in real-time to generate a participant video stream of the participant. The participant video stream of the participant may then be encoded to reduce its data size and the encoded participant video stream may be transmitted to video conference server 102 and/or to participant devices 104 of other participants in the video conference meeting via a communication channel (e.g., a network connection). In some embodiments, the user interface devices may also include one or more output devices (e.g., the display screen, the audio speaker, etc.) that are used to present participant video streams of other participants in the video conference meeting to the participant. Accordingly, the participant may see and hear other participants of the video conference meeting in real-time and vice versa.

Video conference server 102 may be any suitable computing device that manages audio and video communication to and from each participant device 104 of the participants in the video conference meeting. In some embodiments, video conference server 102 may be implemented in the form of a hardware server or a virtual server that includes a processor, a memory, and network communication capabilities (e.g., a communication unit). In some embodiments, video conference server 102 may be located on-site at a physical facility of a video conference services provider, on a cloud-based system of a cloud services provider, or any combination thereof.

Video conferencing system 100 (system 100) depicted in FIG. 1A illustrates a Multipoint Control Unit (MCU) architecture in which video stream processing is performed by video conference server 102. As depicted in FIG. 1A, participant device 104 of a participant in the video conference meeting may transmit a participant video stream capturing the participant to video conference server 102. For example, participant devices 104-1 . . . 104-n may respectively transmit participant video streams 110-1 . . . 110-n (commonly referred to herein as participant video stream 110) to video conference server 102. In some embodiments, participant video stream 110 of a participant received from a participant device 104 may be an original (e.g., uncompressed) video stream of the participant captured by the one or more user interface devices associated with the participant device 104 in real-time. Alternatively, participant video stream 110 of the participant may be encoded (e.g., compressed) to reduce network bandwidth being consumed to transmit participant video stream 110 to video conference server 102.

In some embodiments, when receiving participant video streams 110 of the participants in the video conference meeting from participant devices 104, video conference server 102 may generate a conference video stream 120 of the video conference meeting from the participant video streams 110. For example, video conference server 102 may combine the participant video streams 110 into the conference video stream 120 of the video conference meeting with each participant video stream 110 being rendered in a separate video display window. Accordingly, the conference video stream 120 may include participant video streams 110 of all participants in the video conference meeting. In some embodiments, if the participant video streams 110 are encoded, video conference server 102 may decode participant video streams 110, and generate the conference video stream 120 from the decoded participant video streams 110 in a similar manner.

In some embodiments, when the conference video stream 120 of the video conference meeting is generated, video conference server 102 may encode the conference video stream 120 and transmit encoded conference video stream 120 to all participants of the video conference meeting. In some embodiments, video conference server 102 may generate multiple encoded conference video streams 120 at different video quality levels. Each video quality level may correspond to a particular video resolution and a particular frame rate. Video conference server 102 may then selectively transmit to each participant device 104 an encoded conference video stream 120 that has a particular video quality level corresponding to a current network condition associated with participant device 104. Thus, participant devices 104 of all participants in the video conference may receive the same conference video stream 120 of the video conference meeting but encoded at different video quality levels.

Accordingly, in video conferencing system 100 based on the MCU architecture, video stream processing is performed by video conference server 102, As described herein, video conference server 102 may generate conference video stream 120 of the video conference meeting from participant video streams 110, encode conference video stream 120, and transmit one or more encoded conference video streams 120 corresponding to one or more video quality levels to participant devices 104 of the participants in the video conference meeting.

Video conferencing system 150 (system 150) depicted in FIG. 1B illustrates a Selective Forwarding Unit (SFU) architecture in which video stream processing is performed by participant devices 104. As depicted in FIG. 1B, participant device 104 of a participant in the video conference meeting may transmit a participant video stream capturing the participant in real-time to video conference server 102. For example, participant devices 104-1 . . . 104-n may respectively transmit participant video streams 110-1 . . . 110-n to video conference server 102. As described herein, participant video stream 110 of a participant received from a participant device 104 may be an original (e.g., uncompressed) video stream of the participant or an encoded (e.g., compressed) video stream of the participant. In some embodiments, the participant device 104 may send multiple participant video streams 110 of the participant that are encoded at different video quality levels to video conference server 102.

In some embodiments, video conference server 102 may receive participant video streams 110 of the participants in the video conference meeting from their participant devices 104. For a particular participant device 104 of a particular participant, video conference server 102 may forward participant video streams 110 of other participants in the video conference meeting to the particular participant device 104. For example, as depicted in FIG. 1B, video conference server 102 may forward to participant device 104-1 participant video streams 110-2 . . . 110n that are received from participant device 104-2 . . . 104-n. In some embodiments, a participant device 104 of a participant among the other participants may send multiple participant video streams 110 of the participant that are encoded at different video quality levels to video conference server 102 as described herein. In this case, video conference server 102 may select a participant video stream 110 of the participant that has a video quality level corresponding to a current network condition associated with the particular participant device 104 of the particular participant, and forward the selected participant video stream 110 of the participant to the particular participant device 104.

In some embodiments, when receiving participant video streams 110 of other participants, the particular participant device 104 of the particular participant may decode participant video streams 110 of other participants (if needed), aggregate participant video streams 110 of other participants, and display participant video streams 110 of other participants to the particular participant via one or more output devices associated with the particular participant device 104. Thus, the particular participant device 104 of the particular participant may transmit one or more participant video streams 110 of the particular participant corresponding to different video quality levels to video conference server 102, and receive from video conference server 102 one participant video stream 110 for each participant among the other participants of the video conference meeting.

Accordingly, in the video conferencing system 150 based on the SFU architecture, video conference server 102 may forward participant video streams 110 among participant devices 104 of the participants in the video conference meeting without processing participant video streams 110. Instead, participant video streams 110 may be processed by participant devices 104. As described herein, participant device 104 of a particular participant may encode participant video stream 110 of the particular participant, decode participant video streams 110 of other participants, and aggregate participant video streams 110 of other participants for display.

Regardless of the system architecture (e.g., MCU, SFU), the video conferencing system such as systems 100 and 150 described herein may be subjected to a stringent latency requirement to enable real-time communication between participants of the video conference meeting. To satisfy the latency requirement, a delay between the time at which a video frame of a participant is captured and the time at which the video frame is displayed to other participants may need to satisfy a predefined latency threshold (e.g., 200-500 ms). Due to bandwidth change, network jitter, packet loss, and/or other unpredicted network impairments, it is challenging for the video conferencing system to continually satisfy the latency requirement. As described herein, original real-time video streams associated with the video conference meeting (e.g., conference video stream 120, participant video streams 110) may be encoded and the encoded video streams may be transmitted to video conference server 102 and/or participant devices 104 via one or more communication channels. Accordingly, as a network condition of the communication channels may change over time, the encoded video streams associated with the video conference meeting may be adaptively adjusted to satisfy the latency threshold specified by the latency requirement.

As an example, in video conferencing system 100 based on the MCU architecture, video conference server 102 may analyze a network condition of a communication channel associated with a particular participant device 104, and estimate an available bandwidth of the communication channel. Video conference server 102 may then adjust an encoding process of conference video stream 120 of the video conference meeting based on the available bandwidth to adapt a video quality level (e.g., video resolution and/or frame rate) of encoded conference video stream 120 to the network condition of the communication channel, and transmit encoded conference video stream 120 via the communication channel to particular participant device 104.

As another example, in video conferencing system 150 based on the SFU architecture, video conference server 102 may analyze a network condition of a communication channel associated with a particular participant device 104, and estimate an available bandwidth of the communication channel. Video conference server 102 may then use the available bandwidth to select encoded participant video streams 110 of other participants that have their video quality levels compatible with the network condition of the communication channel, and transmit encoded participant video streams 110 of other participants via the communication channel to particular participant device 104.

Furthermore, different participants may participate in the video conference meeting via different participant devices 104 that have different computing capabilities. Computing capabilities of participant devices 104 may be considered as a factor when adjusting the encoded video streams associated with the video conference meeting. For example, participant device 104 being used to participate in the video conference meeting may be a mobile device or a legacy device that has limited computing resources and therefore an encoded video stream handled by participant device 104 (one or more participant video streams 110 encoded by participant device 104, encoded conference video stream 120 received and decoded by participant device 104) may be limited to a low video quality level to avoid overworking participant device 104 and/or overusing its battery power.

To adjust an encoded video stream associated with a video conference meeting, some video conferencing systems may use one or more predefined rules to determine a video resolution and a frame rate for the encoded video stream. These predefined rules may be based on a general assumption regarding a complexity level of participant video streams 110 and computing capabilities of participant devices 104 in a typical video conference meeting. However, this general assumption may not hold true for a video conference meeting, and thus applying the predefined rules based on the incorrect assumption to the video conference meeting may result in video streams having low video quality level being provided to the participants or may result in resources of participant devices 104 and/or video conference server 102 being used inefficiently.

As an example, an original participant video stream 110 captured by the user interface devices of a participant device 104 may include a sequence of simple video frames depicting a participant with a blank background and minimal movements. Participant device 104 may reference the predefined rules, and configure a video encoder to encode original participant video stream 110 with a relatively high bitrate. Encoding simple video frames with the relatively high bitrate may increase the bandwidth consumed by participant device 104 to transmit encoded participant video stream 110 generated by the video encoder. However, these video frames in high bitrate may not significantly improve the viewing experiences of other participants in the video conference meeting because the video content depicted in these video frames is simple. Thus, the bandwidth resources of participant device 104 may be used inefficiently in this case.

As another example, an original participant video stream 110 captured by the user interface devices of a participant device 104 may include a sequence of complicated video frames depicting a participant with an intricate background and excessive movements. Participant device 104 may reference the predefined rules, and configure a video encoder to encode original participant video stream 110 with a relatively high video resolution. Encoding complicated video frames with the relatively high video resolution may improve the viewing experiences of other participants in the video conference meeting. However, these video frames in high video resolution may require a significant amount of bandwidth for transmission. As a result, when a communication channel associated with participant device 104 is subjected to network impairments, transmitting the video frames having high resolution through the communication channel may result in video frames with low video quality delivered to participant devices 104 of other participants due to high packet loss.

Accordingly, applying predefined rules to adjust a video quality level (e.g., a video resolution and/or frame rate) of an encoded video stream associated with a video conference meeting without considering the video content (e.g., the nature of the video content) being encoded may cause negative user experiences for participants in the video conference meeting and/or result in various resources of video conference server 102 or participant device 104 being used inefficiently.

Systems and methods described herein are capable of managing encoded video streams associated with a video conference meeting in an optimal manner. For example, in some embodiments, the systems and methods may monitor an encoded video stream corresponding to an original real-time video stream (e.g., conference video stream 120, participant video stream 110) of a video conference meeting. The encoded video stream may be associated with a participant of the video conference meeting and may be generated by a video encoder implemented on an encoding device (e.g., video conference server 102 in system 100 based on MCU architecture or participant device 104 in system 150 based on SFU architecture) that encodes the original real-time video stream.

In some embodiments, the systems and methods may determine context data associated with one or more encoded video frames of the encoded video stream. The context data may include at least one of an encoder metric of the video encoder or a content attribute of one or more original video frames in the original real-time video stream. The encoder metric and/or the content attribute may indicate an encoding complexity level of the original real-time video stream. As described herein, the context data may also include a network condition of a communication channel associated with the encoded video stream, an estimated bandwidth of the communication channel, a device capability of the encoding device, a device state of the encoding device, or a meeting context (e.g., speaking statuses of participants) of the video conference meeting.

In some embodiments, the systems and methods may adjust one or more encoded video streams corresponding to the original real-time video stream based on the context data. As an example, the systems and methods may determine, from the one or more encoded video stream and based on the context data, a first encoded video stream corresponding to a first video quality level (e.g., the first encoded video stream may have a first video resolution and a first frame rate) and a second encoded video stream corresponding to a second video quality level (e.g., the second encoded video stream may have a second video resolution and a second frame rate). The systems and methods may enable the first encoded video stream and disable the second encoded video stream for the participant. Accordingly, participant device 104 of the participant may transmit the first encoded video stream but may not transmit the second encoded video stream to video conference server 102 and/or to participant devices 104 of other participants in the video conference meeting. As another example, the systems and methods may adjust one or more encoder configuration parameters (e.g., a target bitrate) of the video encoder based on the context data. Accordingly, the video encoder implemented on the encoding device (e.g., video conference server 102 or participant device 104) may encode current and future video frames in the original real-time video stream with the adjusted encoder configuration parameters. Other types of adjustment for the one or more encoded video streams are also possible and contemplated.

Systems and methods described herein may be advantageous in a number of technical respects. For example, as described herein, the context data based on which the one or more encoded video streams corresponding to the original real-time video stream are adjusted may include the encoder metric and/or the content attribute that indicates the encoding complexity level of the original real-time video stream. Thus, as the one or more encoded video streams are adjusted with a consideration of the video content being encoded, various resources of the encoding device (e.g., computing cycles for encoding the original real-time video stream, network bandwidth for transmitting the encoded video streams, etc.) may be used efficiently and the video quality of the video streams delivered to participant devices 104 of other participants in the video conference meeting may be improved.

In addition, because the context data may include other factors such as the network condition and the estimated bandwidth of the communication channel associated with the encoded video stream, the device capability and the device state of the encoding device, and/or the meeting context of the video conference meeting, the encoded video streams may be adaptively adjusted for the specific context of the video conference meeting instead of applying common predefined rules for multiple video conference meetings that have different contexts. As a result, the utilization of various resources of the encoding device and the video quality the video streams delivered to other participants in the video conference meeting may be improved in an optimal manner.

Furthermore, the systems and methods described herein are capable of satisfying the stringent latency requirement of a real-time video conference meeting. As described herein, the context data may be determined from one or more encoded video frames of the encoded video stream in which the one or more encoded video frames may correspond to a past time window that precedes an original video frame being encoded at a current timestamp in the original real-time video stream. In contrast, a near real-time application (e.g., a "live" video streaming application), which does not have as stringent a latency requirement as a real-time video conferencing application, may receive a video frame, wait for one or more subsequent video frames to arrive, and encode the video frame based on the video frame and the subsequent video frames. A real-time video conferencing application with the more stringent latency requirement may not be able to satisfy its stringent latency requirement if equipped to use this same technique. Instead, by using the context data determined from the encoded video frames in the past time window to adjust the encoding process of the original real-time video stream, the systems and methods described herein may avoid analyzing the original video frame currently being encoded and also avoid waiting for video frames subsequent to the original video frame to arrive. As a result, the delay caused by the systems and methods to encode the original video frame may be significantly lower than the delay caused by the near real-time application to encode a video frame, and thus the systems and methods described herein are capable of satisfying the stringent latency requirement of the real-time video conference meeting.

Various illustrative embodiments will now be described in detail with reference to the figures. It will be understood that the illustrative embodiments described below are provided as examples and that other examples not explicitly described herein may also be captured by the scope of the claims set forth below. Systems and methods described herein may provide any of the benefits mentioned above, as well as various additional and/or alternative benefits that will be described and/or made apparent below.

Figure 2:
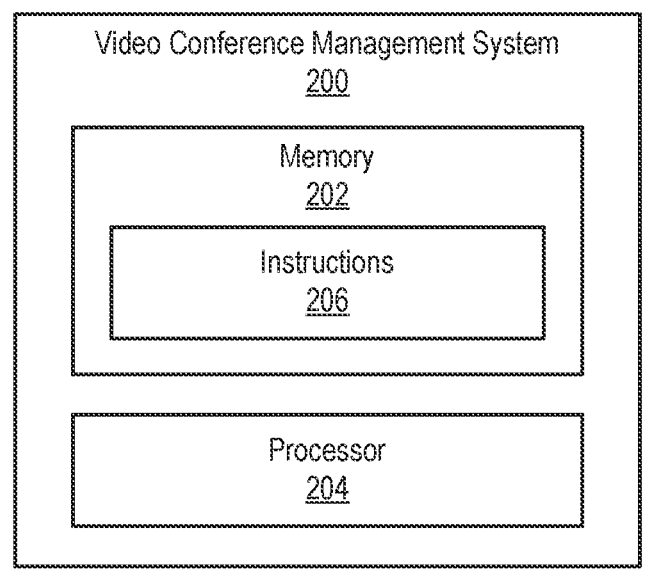
FIG. 2 shows an illustrative video conference management system according to embodiments described herein.

FIG. 2 shows an illustrative video conference management system 200 configured to manage one or more encoded video streams associated with a video conference meeting for a video conference system such as systems 100 and 150 depicted in FIGS. 1A and 1B. In some embodiments, video conference management system 200 may be implemented on an encoding device within the video conference system and/or on a separate computing system communicatively coupled to the encoding device. As an example, for video conferencing system 100 based on the MCU architecture, video conference management system 200 may be implemented on video conference server 102 that is configured to encode conference video stream 120 of a video conference meeting. Additionally or alternatively, video conference management system 200 may be implemented on a computing system (e.g., a cloud server) communicatively coupled to video conference server 102. As another example, for video conferencing system 150 based on the SFU architecture, video conference management system 200 may be implemented on one or more participant devices 104 that are configured to encode participant video streams 110 of participants in a video conference meeting. Additionally or alternatively, video conference management system 200 may be implemented on a computing system (e.g., a cloud server) communicatively coupled to one or more participant devices 104.

As depicted, video conference management system 200 may include, without limitation, a memory 202 and a processor 204 selectively and communicatively coupled to one another. Memory 202 and processor 204 may each include or be implemented by computer hardware that is configured to store and/or execute computer software. Various other components of computer hardware and/or software not explicitly shown in FIG. 2 may also be included within video conference management system 200, In some examples, memory 202 and processor 204 may be distributed between multiple components, multiple devices, and/or multiple locations as may serve a particular implementation.

Memory 202 may store and/or otherwise maintain executable data used by processor 204 to perform any of the functionality described herein. For example, memory 202 may store instructions 206 that may be executed by processor 204. Additionally, memory 202 may also maintain any other data accessed, managed, used, and/or transmitted by processor 204 in a particular implementation. Memory 202 may be implemented by one or more memory or storage devices, including any memory or storage devices described herein, that are configured to store data in a transitory or non-transitory manner.

Instructions 206 may be executed by processor 204 to cause video conference management system 200 to perform any of the functionality described herein. For example, instructions 206 may include a video conference management application configured to perform any of the functionality described herein. In some embodiments, the video conference management application may include various operating modes (e.g., an encoder adjustment mode, a stream selection mode, etc.) that may be enabled, disabled, or configured to selectively activate or deactivate various operations described herein. Instructions 206 may be implemented by any suitable application, software, code, and/or other executable data instance(s).

Processor 204 may be implemented by one or more computer processing devices, including general purpose processors (e.g., central processing units (CPUs), graphics processing units (GPUs), microprocessors, etc.), special purpose processors (e.g., application specific integrated circuits (ASICs), field-programmable gate arrays (FPGAs), etc.), or the like. Using processor 204 (e.g., when processor 204 is directed to perform operations represented by instructions 206 stored in memory 202), video conference management system 200 may perform various functions associated with adaptive video conferencing in any manner described herein or as may serve a particular implementation.

Figure 3:
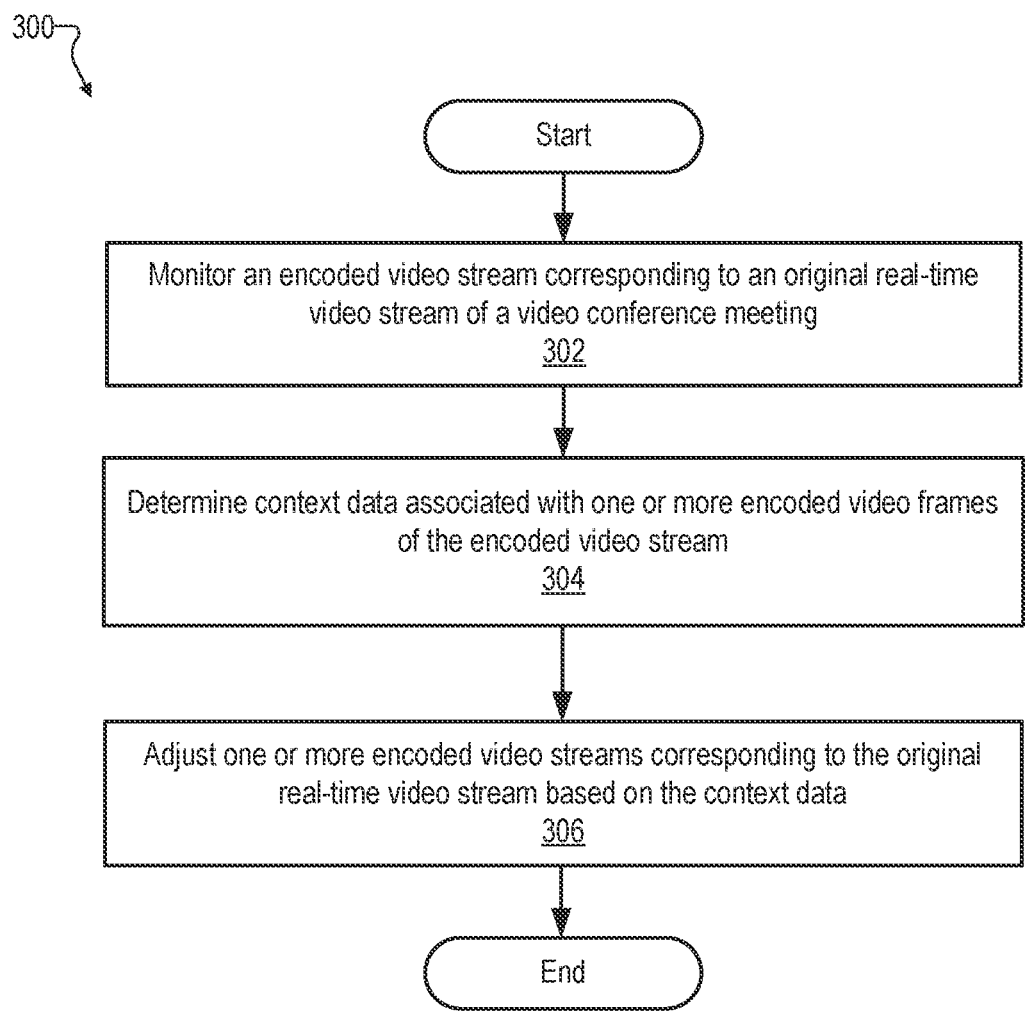
FIG. 3 shows an illustrative method for a video conference management system according to embodiments described herein.

FIG. 3 shows an illustrative method 300, which may be performed by video conference management system 200 and/or by any implementation thereof for adaptive video conferencing in which one or more encoded video streams associated with the video conference meeting may be optimally adjusted. While FIG. 3 shows illustrative operations according to one embodiment, other embodiments may omit, add to, reorder, and/or modify any of the operations shown in FIG. 3. In some examples, multiple operations shown in FIG. 3 or described in relation to FIG. 3 may be performed concurrently (e.g., in parallel) with one another, rather than being performed sequentially as illustrated and/or described.

At operation 302, video conference management system 200 may monitor an encoded video stream corresponding to an original real-time video stream of a video conference meeting. In some embodiments, the original real-time video stream may be an uncompressed video stream of the video conference meeting that is captured or generated in real-time. As a first example, in video conferencing system 100 based on the MCU architecture, the original real-time video stream may be conference video stream 120 that is generated from participant video streams 110 of participants in the video conference meeting by video conference server 102. As a second example, in video conferencing system 150 based on the SFU architecture, the original real-time video stream may be participant video stream 110 of a participant in the video conference meeting that is captured by the user interface devices associated with participant device 104 of the participant.

In some embodiments, the original real-time video stream may be encoded by a video encoder to generate the encoded video stream corresponding to the original real-time video stream. The encoded video stream may have a smaller data size than the original real-time video stream, and therefore require a lower bandwidth for transmission.

In the first example, conference video stream 120 as the original real-time video stream may be encoded by a video encoder implemented on video conference server 102. Accordingly, video conference server 102 may be considered an encoding device that encodes the original real-time video stream into the encoded video stream. In this example, the encoded video stream may be transmitted to participant device 104 of a participant in the video conference meeting, and participant device 104 to which the encoded video stream is transmitted may be considered participant device 104 associated with the encoded video stream.

In the second example, participant video stream 110 as the original real-time video stream may be encoded by a video encoder implemented on participant device 104 of the participant. Accordingly, participant device 104 may be considered an encoding device that encodes the original real-time video stream into the encoded video stream. In this example, participant device 104 that generates the original real-time video stream and encodes the original real-time video stream into the encoded video stream may be considered participant device 104 associated with the encoded video stream.

At operation 304, video conference management system 200 may determine (e.g., based on the monitoring) context data associated with one or more encoded video frames of the encoded video stream. The one or more encoded video frames may be frames recently encoded by an encoding device. For example, the one or more encoded video frames may correspond to a past time window that consecutively precedes an original video frame being encoded at a current timestamp in the original real-time video stream. In some embodiments, video conference management system 200 may receive various operation data associated with the one or more encoded video frames from various components (e.g., the video encoder, the processing unit, the network communication unit, etc.) of the encoding device that generates the encoded video stream, and analyze the operation data to determine the context data associated with the one or more encoded video frames.

In some embodiments, the context data may include at least one of an encoder metric of the video encoder or a content attribute of one or more original video frames in the original real-time video stream that correspond to the one or more encoded video frames. In some embodiments, the encoder metric and/or the content attribute may indicate an encoding complexity level of the original real-time video stream. The encoding complexity level may indicate the complexity to encode original video frames in an original real-time video stream. Examples of the encoder metric, the content attribute, and the encoding complexity are described herein. As also described herein, in addition an encoder metric and/or a container attribute being included in the context data, the context data may include a network condition of a communication channel associated with the encoded video stream, an estimated bandwidth of the communication channel, a device capability of the encoding device, a device state of the encoding device, a meeting context (e.g., speaking statuses of participants) of the video conference meeting, and/or other types of context data.

At operation 306, video conference management system 200 may adjust one or more encoded video streams corresponding to the original real-time video stream based on the context data. For example, video conference management system 200 may determine from the one or more encoded video streams a first encoded video stream and a second encoded video stream based on the context data. The first encoded video stream may correspond to a first video quality level with a first video resolution and a first frame rate, while the second encoded video stream may correspond to a second video quality level with a second video resolution and a second frame rate. Video conference management system 200 may enable the first encoded video stream and disable the second encoded video stream for the participant. Accordingly, the encoding device (e.g., video conference server 102 or participant device 104 of the participant) may transmit the first encoded video stream but may not transmit the second encoded video stream for the participant. As another example, video conference management system 200 may adjust one or more encoder configuration parameters (e.g., a target bitrate) of the video encoder based on the context data. Accordingly, the video encoder implemented on the encoding device may encode current and future original video frames of the original real-time video stream with the adjusted encoder configuration parameters.

Figure 4A:
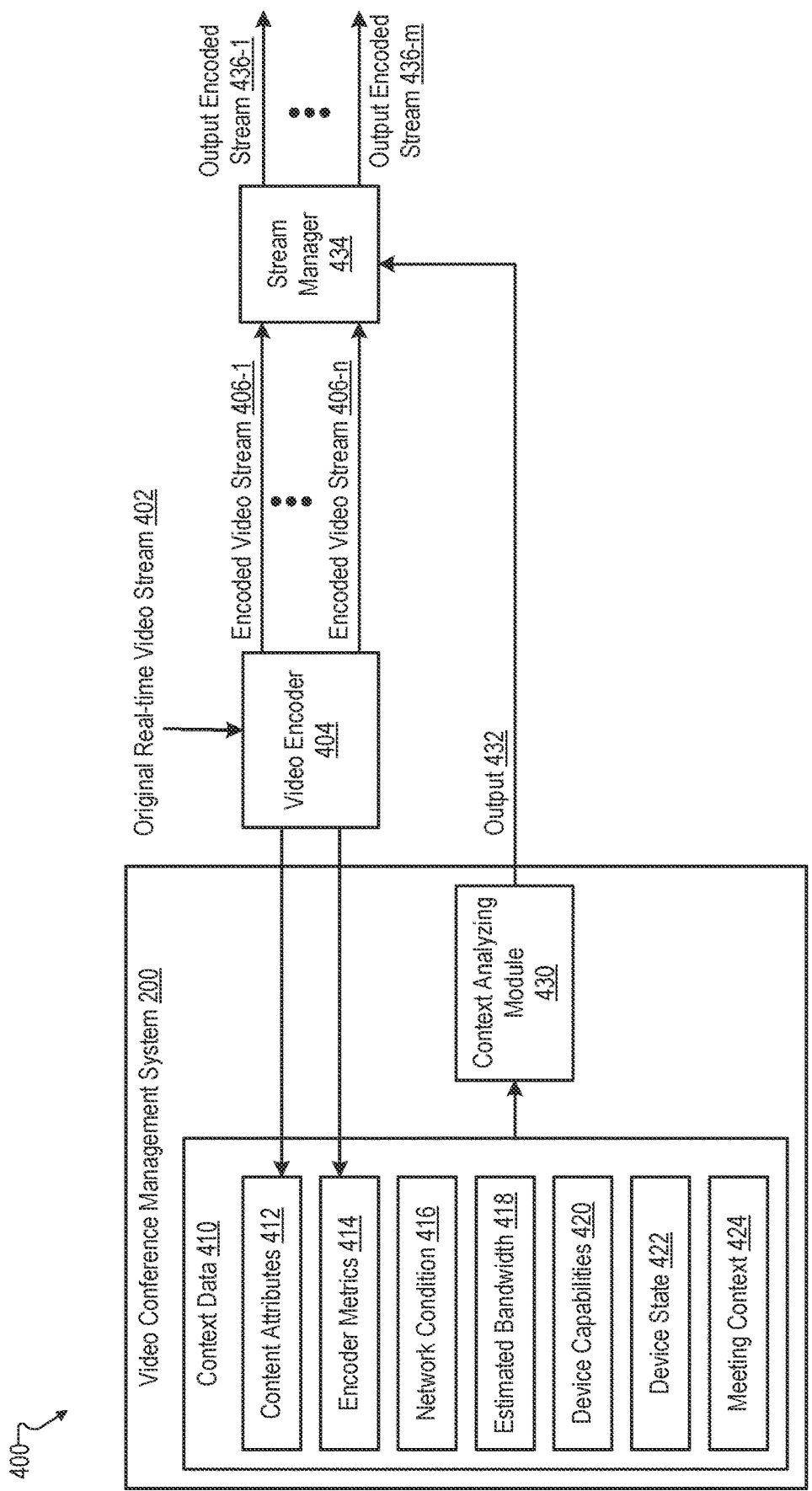
FIGS. 4A-4C show illustrative implementations of a video conference management system according to embodiments described herein.
Figure 4B:
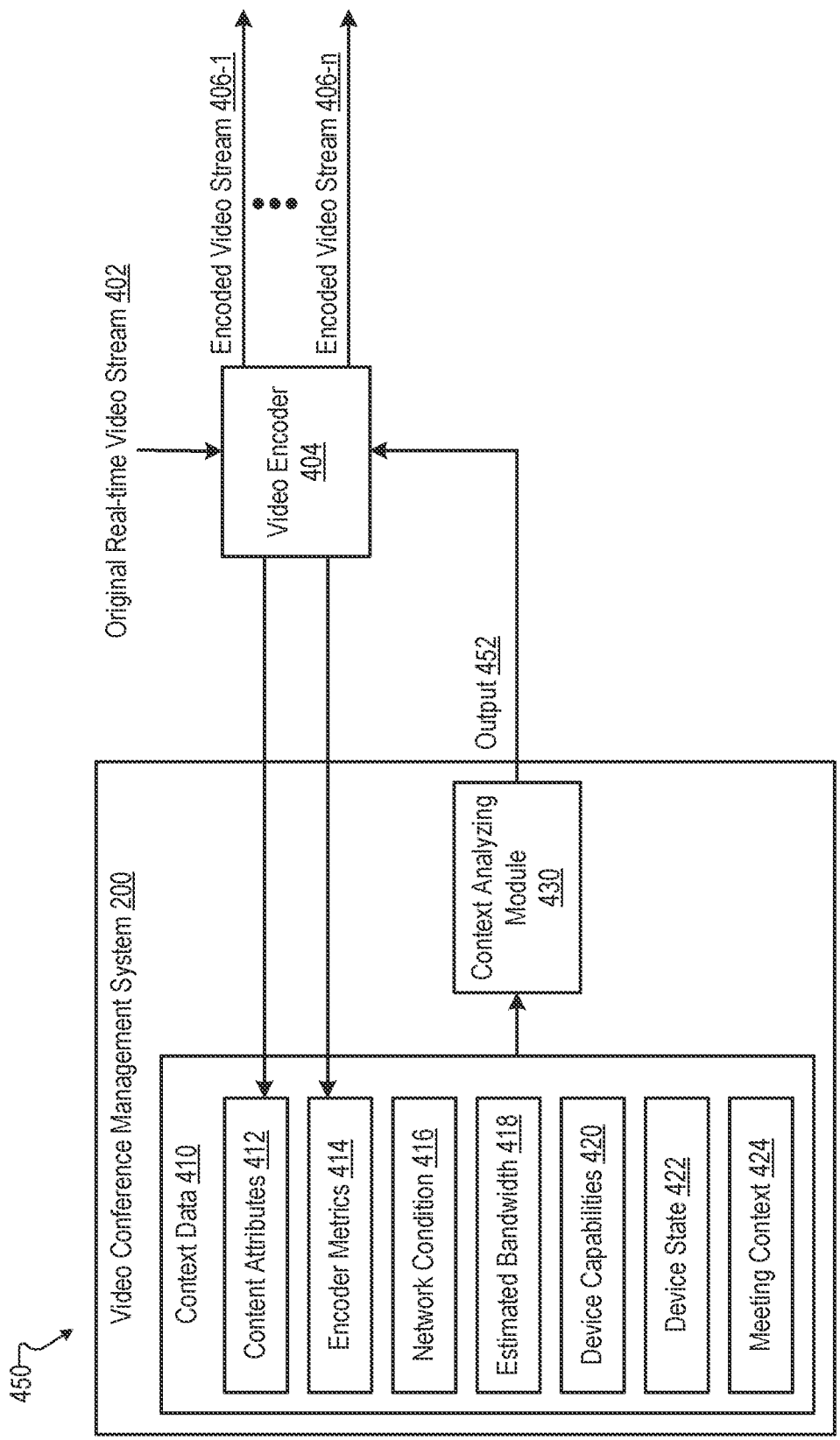
Figure 4C:
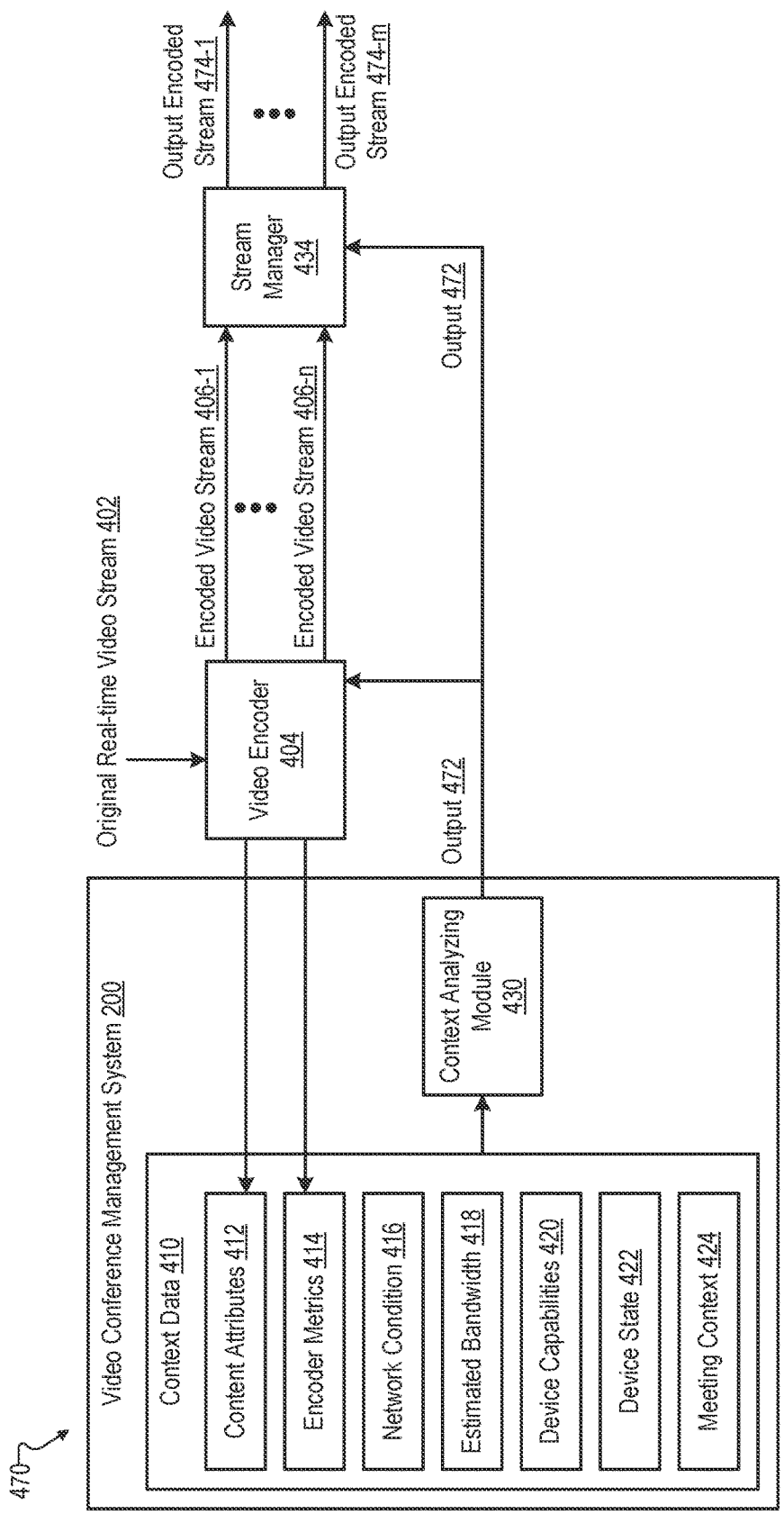

FIGS. 4A-4C respectively show diagrams 400, 450, and 470 illustrating various implementations of video conference management system 200 configured to perform method 300 described above. As depicted in FIGS. 4A-4C, an original real-time video stream 402 of a video conference meeting may be input into a video encoder 404 of an encoding device (e.g., video conference server 102 in video conferencing system 100 based on the MCU architecture, participant device 104 in video conferencing system 150 based on the SFU architecture), and video encoder 404 may encode original real-time video stream 402 to generate one or more encoded video streams 406-1 . . . 406-n (commonly referred to herein as encoded video stream 406). Examples of original real-time video stream 402 and encoded video stream 406 are illustrated in FIG. 5. As depicted in FIG. 5, original real-time video stream 402 may include an original video frame 500 currently being encoded at a current timestamp to.

In some embodiments, to determine context data video conference management system 200 may identify an encoded video stream 406 that is transmitted from the encoding device to one or more other computing devices of the video conferencing system. As an example, in video conferencing system 100 based on the MCU architecture, the encoding device may be video conference server 102, and encoded video stream 406 may be an encoded conference video stream 120 that is transmitted from video conference server 102 to one or more participant devices 104. As another example, in video conferencing system 150 based on the SFU architecture, the encoding device may be participant device 104 of a participant, and encoded video stream 406 may be an encoded participant video stream 110 of the participant that is transmitted from participant device 104 to video conference server 102.

In some embodiments, video conference management system 200 may identify one or more encoded video frames of encoded video stream 406. For example, as depicted in FIG. 5, video conference management system 200 may determine that original video frame 500 of original real-time video stream 402 is currently being encoded at a current timestamp to, and determine a past time window 505 that has a predefined time length (e.g., 5s) and consecutively precedes original video frame 500, with no time gap or no extra video frame or video frames between past time window 505 and the current timestamp to associated with original video frame 500. Video conference management system 200 may then identify one or more encoded video frames in encoded video stream 406 that correspond to past time window 505.

For example, as depicted in FIG. 5, video conference management system 200 may determine original video frames 510-1 . . . 510-n (commonly referred to herein as original video frames 510) of original real-time video stream 402 in which each original video frame 510 is encoded at a past timestamp within past time window 505. Video conference management system 200 may then determine one or more encoded video frames 520-1 . . . 520-n (commonly referred to herein as encoded video frames 520) of encoded video stream 406 that are generated from encoding original video frames 510 of original real-time video stream 402. Accordingly, encoded video frames 520 of encoded video stream 406 may correspond to original video frames 510 of original real-time video stream 402 that are recently encoded prior to original video frame 500 being encoded at current timestamp to as depicted in FIG. 5.

As another example, video conference management system 200 may determine one or more encoded video frames 520 of encoded video stream 406 that are generated at a past timestamp within past time window 505, Video conference management system 200 may then determine one or more original video frames 510 of original real-time video stream 402 that are encoded to generate one or more encoded video frames 520 of encoded video stream 406. Accordingly, video conference management system 200 may determine encoded video frames 520 of encoded video stream 406 before or after determining original video frames 510 of original real-time video stream 402. Other implementations for determining encoded video frames 520 of encoded video stream 406 and/or determining original video frames 510 of original real-time video stream 402 are also possible and contemplated.

In some embodiments, when or after encoded video frames 520 of encoded video stream 406 are identified, video conference management system 200 may determine context data associated with encoded video frames 520. For example, video conference management system 200 may receive various operation data associated with encoded video frames 520 from various components (e.g., video encoder 404, the video conferencing application, the processing unit, the network communication unit, etc.) of the encoding device that generates encoded video stream 406, and parse or analyze the operation data of these components to determine context data 410 associated with encoded video frames 520. As depicted in FIGS. 4A-4C, context data 410 may include one or more content attributes 412, one or more encoder metrics 414, a network condition 416, an estimated bandwidth 418, one or more device capabilities 420, a device state 422, and a meeting context 424. Other types of context data 410 are also possible and contemplated.

In some embodiments, to determine context data 410, video conference management system 200 may determine one or more content attributes 412 of original video frames 510 in original real-time video stream 402 that correspond to encoded video frames 520 in encoded video stream 406. Content attributes 412 may reflect characteristics of video content included in original video frames 510 of original real-time video stream 402, and therefore may indicate an encoding complexity level of original real-time video stream 402. As described herein, the encoding complexity level of original real-time video stream 402 may measure the complexity to encode original video frames 510 in original real-time video stream 402.

In some embodiments, content attributes 412 may include an average sum of absolute differences (SAD) between two consecutive original video frames 510 among original video frames 510 corresponding to encoded video frames 520. To compute the average SAD for a pair of consecutive original video frames 510 including a first original video frame 510 followed by a second original video frame 510 in original real-time video stream 402, video conference management system 200 may compute an absolute difference between each pixel in first original video frame 510 and a corresponding pixel in second original video frame 510. Video conference management system 200 may calculate a sum value of the absolute differences for all pixels in first original video frame 510, and divide the sum value by a number of pixels in first original video frame 510 to compute the average SAD between first original video frame 510 and second original video frame 510. The average SAD may represent the average temporal difference between first original video frame 510 and second original video frame 510 in original real-time video stream 402, and therefore may indicate the temporal complexity to encode original real-time video stream 402. In some embodiments, video conference management system 200 may compute the average SAD for each pair of consecutive original video frames 510 among original video frames 510 corresponding to encoded video frames 520.

In some embodiments, content attributes 412 may also include an average macroblock variance of an original video frame 510 among original video frames 510 corresponding to encoded video frames 520. To compute the average macroblock variance for an original video frame 510 in original real-time video stream 402, video conference management system 200 may compute a macroblock variance for each macroblock in original video frame 510. The macroblock variance may indicate a level of variance in pixel values of multiple pixels within the macroblock. Video conference management system 200 may calculate a sum value of the macroblock variances for all macroblocks in original video frame 510, and divide the sum value by a number of macroblocks in original video frame 510 to compute the average macroblock variance for original video frame 510. The average macroblock variance may represent the average spatial difference and/or noise within a macroblock in original video frame 510, and therefore may indicate the spatial complexity to encode original real-time video stream 402. In some embodiments, video conference management system 200 may compute the average macroblock variance for each original video frame 510 among original video frames 510 corresponding to encoded video frames 520.

Accordingly, content attributes 412 of original video frames 510 in original real-time video stream 402 such as the average SAD and the average macroblock variance may indicate the characteristics (e.g., the average temporal difference, the average spatial difference, etc.) of video content depicted in original real-time video stream 402, and therefore may indicate the level of complexity to encode original real-time video stream 402. Other types of content attributes 412 are also possible and contemplated.

In some embodiments, to determine context data 410, video conference management system 200 may determine one or more encoder metrics 414 associated with one or more encoding operations of video encoder 404 to encode original video frames 510 of original real-time video stream 402 into encoded video frames 520 of encoded video stream 406. Encoder metrics 414 may reflect the complexity of the encoding operations performed by video encoder 404 to encode original video frames 510 into encoded video frames 520, and therefore may indicate the encoding complexity level of original real-time video stream 402.

In some embodiments, encoder metrics 414 may include an average quantization parameter (QP) value associated with encoded video frames 520. A QP value may indicate a quantization step size being used by video encoder 404 to perform quantization in an encoding process. In some embodiments, an increase in the QP value may result in an increase in video distortion and a decrease in an output bitrate of video encoder 404.

In some embodiments, to compute the average QP value for encoded video frames 520, video conference management system 200 may assign different weight values for different encoded video frames 520. For example, encoded video frames 520 may include a first encoded video frame 520 (e.g., encoded video frame 520-$n$) at a first timestamp and a second encoded video frame 520 (e.g., encoded video frame 520-1) at a second timestamp subsequent to the first timestamp, Video conference management system 200 may assign a first weight value for first encoded video frame 520 and assign a second weight value for second encoded video frame 520 in which the second weight value is higher than the first weight value. Accordingly, second encoded video frame 520 that has a more recent position in encoded video stream 406 than first encoded video frame 520 may be given a higher weight than first encoded video frame 520 in computing the average QP value for encoded video frames 520, To compute the average QP value, for each encoded video frame 520, video conference management system 200 may multiply a QP value being used by video encoder 404 to generate encoded video frame 520 by a weight value assigned to encoded video frame 520 to compute a product value associated with encoded video frame 520. Video conference management system 200 may calculate a first sum value of the product values associated with encoded video frames 520, calculate a second sum value of the weight values assigned to encoded video frames 520, and divide the first sum value by the second sum value to compute the average QP value of encoded video frames 520.

In some embodiments, the average QP value of encoded video frames 520 in encoded video stream 406 may indicate the encoding complexity level to encode original real-time video stream 402 with a current configuration (e.g., a current target bitrate) of video encoder 404. In some embodiments, if a difference between the average QP value of encoded video frames 520 and a lowest QP value configured for video encoder 404 satisfies a first predefined difference threshold (e.g., less than 10 points), original real-time video stream 402 may be considered relatively easy to encode and may have a low encoding complexity level. On the other hand, if the difference between the average QP value of encoded video frames 520 and a highest QP value configured for video encoder 404 satisfies a second predefined difference threshold (e.g., less than 12 points), original real-time video stream 402 may be considered relatively difficult to encode and may have a high encoding complexity level.

In some embodiments, encoder metrics 414 may also include an average encode time associated with encoded video frames 520. An encode time of an encoded video frame 520 may indicate an amount of time during which video encoder 404 performs one or more encoding operations to generate encoded video frame 520.

In some embodiments, the average encode time of encoded video frames 520 may be computed in a manner similar to computing the average QP value of encoded video frames 520 described above. For example, video conference management system 200 may assign different weight values for different encoded video frames 520 such that a second encoded video frame 520 that has a more recent position in encoded video stream 406 than a first encoded video frame 520 may be given a higher weight than first encoded video frame 520. To compute the average encode time, for each encoded video frame 520, video conference management system 200 may multiply an encode time during which video encoder 404 performs encoding operations to generate encoded video frame 520 by a weight value assigned to encoded video frame 520 to compute a product value associated with encoded video frame 520. Video conference management system 200 may calculate a first sum value of the product values associated with encoded video frames 520, calculate a second sum value of the weight values assigned to encoded video frames 520, and divide the first sum value by the second sum value to compute the average encode time of encoded video frames 520.

In some embodiments, the average encode time of encoded video frames 520 in encoded video stream 406 may indicate the encoding complexity level to encode original real-time video stream 402 given resource constraints and a current device state of the encoding device (e.g., conference server 102 in system 100 based on MCU architecture, participant device 104 in system 150 based on SFU architecture). In some embodiments, video conference management system 200 may compare the average encode time of encoded video frames 520 to an encode time limit for encoding an original video frame 510 of original real-time video stream 402 into an encoded video frame 520 of encoded video stream 406. The encode time limit may be an inverse of a frame rate of original real-time video stream 402. In some embodiments, if the average encode time of encoded video frames 520 is higher than the encode time limit by a difference amount satisfying a predefined difference threshold (e.g., 20%), video conference management system 200 may determine that encoding original real-time video stream 402 at a current video quality level (e.g., current video resolution and/or current frame rate) configured for video encoder 404 is too burdensome and unsustainable for the encoding device.

In some embodiments, encoder metrics 414 may also include an encoding mode distribution associated with encoded video frames 520. The encoding mode distribution may indicate a distribution of various encoding modes being used by video encoder 404 to encode original video frames 510 of original real-time video stream 402 into encoded video frames 520 of encoded video stream 406. In some embodiments, the encoding modes being used by video encoder 404 may include an intra-frame mode and an inter-frame mode. In the intra-frame mode, compression operations may be performed using only information contained within an original video frame being encoded. Accordingly, the original video frame being encoded may be subjected to spatial compression and an encoded video frame corresponding to the original video frame may be referred to as an intra-frame or an I frame. On the other hand, in the inter-frame mode, compression operations may be performed based on a difference between an original video frame being encoded and a previous video frame preceding the original video frame. Accordingly, the original video frame being encoded may be subjected to temporal compression and an encoded video frame corresponding to the original video frame may be referred to as an inter-frame or a predicted frame or a P frame. As described herein, to satisfy the stringent latency requirement of the video conference meeting, video conference management system 200 may not wait for future video frames subsequent to the original video frame currently being encoded to arrive. Therefore, unlike encoding processes performed for near real-time applications (e.g., a "live" video streaming application), video encoder 404 may not use encoding modes such as a bidirectional predicted frame mode in which compression operations are performed based on a difference between the original video frame being encoded and a subsequent video frame following the original video frame.

In some embodiments, to determine the encoding mode distribution, for each encoded video frame 520, video conference management system 200 may determine a quantity of macroblocks being encoded with the intra-frame mode in encoded video frame 520, a quantity of macroblocks that has a motion vector of zero value in encoded video frame 520, and/or a quantity and magnitudes of large motion vectors associated with the macroblocks of encoded video frame 520. In some embodiments, if a motion vector has its magnitude satisfying a magnitude threshold (e.g., higher than 20% of a frame size), the motion vector may be considered a large motion vector. Other factors reflecting the encoding mode distribution are also possible and contemplated.

In some embodiments, the encoding mode distribution of encoded video frames 520 in encoded video stream 406 may indicate an amount of motion in the video content depicted in corresponding original video frames 510 of original real-time video stream 402. For example, if a percentage of macroblocks encoded with the intra-frame mode in an encoded video frame 520 satisfies a first percentage threshold (e.g., less than 5%), video conference management system 200 may determine that an original video frame 510 corresponding to encoded video frame 520 depicts video content that has low motion. As another example, if a percentage of macroblocks with the motion vector of zero value in an encoded video frame 520 satisfies a second percentage threshold (e.g., less than 10%), video conference management system 200 may determine that an original video frame 510 corresponding to encoded video frame 520 depicts video content that has high motion. As another example, if a percentage of macroblocks having large motion vectors in an encoded video frame 520 satisfying a third percentage threshold (e.g., more than 15%), video conference management system 200 may determine that an original video frame 510 corresponding to encoded video frame 520 depicts video content that has high motion. In some embodiments, if original real-time video stream 402 depicts video content that has high motion, a temporal difference between two consecutive original video frames 510 of original real-time video stream 402 may be relatively large, and therefore original real-time video stream 402 may be considered as having a high encoding complexity level.

In some embodiments, encoder metrics 414 may also include an average ratio between an average number of bits in one or more I frames within a predefined time period and an average number of bits in one or more P frames within the predefined time period. The predefined time period may be within past time window 505 corresponding to encoded video frames 520. For example, as depicted in FIG. 5, past time window 505 may be divided into a plurality of predefined time periods 525-1 . . . 525-n (commonly referred to herein as predefined time period 525). Each predefined time period 525 may have a predefined time length (e.g., 1 s) and may correspond to one or more encoded video frames 520 that are generated within predefined time period 525. For example, as depicted in FIG. predefined time period 525-1 may correspond to encoded video frames 530-1 . . . 530-m among encoded video frames 520, while predefined time period 525-n may correspond to encoded video frames 540-1 . . . 540-p among encoded video frames 520.

In some embodiments, for each predefined time period 525, video conference management system 200 may calculate an average number of bits in one or more I frames corresponding to predefined time period 525. For example, video conference management system 200 may identify one or more I frames among encoded video frames 520 corresponding to predefined time period 525, Video conference management system 200 may calculate a total number of bits in the I frames and divide the total number of bits in the I frames by a number of I frames to compute the average number of bits in the I frames corresponding to predefined time period 525. Similarly, video conference management system 200 may calculate an average number of bits in one or more P frames corresponding to predefined time period 525. For example, video conference management system 200 may identify one or more P frames among encoded video frames 520 corresponding to predefined time period 525. Video conference management system 200 may calculate a total number of bits in the P frames and divide the total number of bits in the P frames by a number of P frames to compute the average number of bits in the P frames corresponding to predefined time period 525. In some embodiments, video conference management system 200 may compute a ratio between the average number of bits in the I frames corresponding to predefined time period 525 and the average number of bits in the P frames corresponding to predefined time period 525. This ratio may also be referred to herein as the I frame-P frame bit ratio corresponding to predefined time period 525.

In some embodiments, video conference management system 200 may compute the average ratio between the average number of bits in the I frames and the average number of bits in the P frames for predefined time periods 525 in past time window 505. This average ratio may be computed in a manner similar to computing the average QP value of encoded video frames 520 described herein. For example, video conference management system 200 may assign different weight values for different predefined time periods 525 such that a second predefined time period 525 (e.g, predefined time period 525-1) that is more recent than a first predefined time period 525 (e.g., predefined time period 525-n) may be given a higher weight than first predefined time period 525. To compute the average ratio between the average number of bits in the I frames and the average number of bits in the P frames, for each predefined time period 525, video conference management system 200 may multiply an I frame-P frame bit ratio corresponding to predefined time period 525 by a weight value assigned to predefined time period 525 to compute a product value associated with predefined time period 525. Video conference management system 200 may calculate a first sum value of the product values associated with predefined time periods 525, calculate a second sum value of the weight values assigned to predefined time periods 525, and divide the first sum value by the second sum value to compute the average ratio between the average number of bits in the I frames and the average number of bits in the P frames corresponding to predefined time periods 525 in past time window 505.

In some embodiments, the average ratio between the average number of bits in the I frames and the average number of bits in the P frames corresponding to predefined time periods 525 in past time window 505 may indicate an amount of motion in the video content depicted in corresponding original video frames 510 of original real-time video stream 402. For example, if the average ratio between the average number of bits in the I frames and the average number of bits in the P frames within predefined time periods 525 satisfies an average ratio threshold (e.g., more than 4 times), video conference management system 200 may determine that encoded video frames 520 corresponding to predefined time periods 525 include a large number of bits in I frames as compared to a number of bits in P frames, and therefore determine that original video frames 510 corresponding to encoded video frames 520 depict video content that has low motion. In some embodiments, if original real-time video stream 402 depicts video content that has low motion, a temporal difference between two consecutive original video frames 510 of original real-time video stream 402 may be relatively small, and therefore original real-time video stream 402 may be considered as having a low encoding complexity level.

In some embodiments, encoder metrics 414 may also include an average difference between a target bitrate and an output bitrate of video encoder 404 in encoding original video frames 510 of original real-time video stream 402 into encoded video frames 520 of encoded video stream 406.

In some embodiments, to compute the average difference between the target bitrate and the output bitrate of video encoder 404, for each encoded video frame 520 of encoded video stream 406 corresponding to an original video frame 510 of original real-time video stream 402, video conference management system 200 may calculate a difference between a target bitrate and an output bitrate of video encoder 404 when video encoder 404 encodes original video frame 510 into encoded video frame 520. Video conference management system 200 may then compute the average difference between the target bitrate and the output bitrate of video encoder 404 in a manner similar to computing the average QP value of encoded video frames 520 described herein. For example, video conference management system 200 may assign different weight values for different encoded video frames 520 such that a second encoded video frame 520 that has a more recent position in encoded video stream 406 than a first encoded video frame 520 may be given a higher weight than first encoded video frame 520. To compute the average difference between the target bitrate and the output bitrate of video encoder 404, for each encoded video frame 520, video conference management system 200 may multiply a difference between a target bitrate and an output bitrate of video encoder 404 when video encoder 404 performs encoding operations to generate encoded video frame 520 by a weight value assigned to encoded video frame 520 to compute a product value associated with encoded video frame 520. Video conference management system 200 may calculate a first sum value of the product values associated with encoded video frames 520, calculate a second sum value of the weight values assigned to encoded video frames 520, and divide the first sum value by the second sum value to compute the average difference between the target bitrate and the output bitrate of video encoder 404.

In some embodiments, the average difference between the target bitrate and the output bitrate of video encoder 404 in encoding original video frames 510 of original reap time video stream 402 into encoded video frames 520 of encoded video stream 406 may indicate the encoding complexity level of original real-time video stream 402. In some embodiments, if the output bitrate of video encoder 404 is higher than the target bitrate of video encoder 404 with the average difference between the target bitrate and the output bitrate of video encoder 404 satisfying a predefined bitrate difference threshold (e.g., higher than 20%), video conference management system 200 may determine that the output bitrate of video encoder 404 is usually higher than the target bitrate of video encoder 404 by a significant amount, and therefore determine that original real-time video stream 402 is relatively difficult to encode with the current target bitrate configured for video encoder 404.

Accordingly, encoder metrics 414 (e.g., the average QP value, the average encode time, the encoding mode distribution, the average number of bits in I frames and the average number of bits in P frames, the average difference between the target bitrate and the output bitrate of video encoder 404) may indicate the complexity of encoding operations performed by video encoder 404 to encode original video frames 510 of original real-time video stream 402 into encoded video frames 520 of encoded video stream 406, and therefore may indicate the level of complexity to encode original real-time video stream 402. Other types of encoder metrics 414 are also possible and contemplated.

In some embodiments, to determine context data 410, video conference management system 200 may determine network condition 416 of a communication channel associated with encoded video stream 406. The communication channel associated with encoded video stream 406 may be the communication channel of participant device 104 associated with encoded video stream 406. As described herein, in video conferencing system 100 based on the MCU architecture, encoded video stream 406 may be encoded conference video stream 120 transmitted from video conference server 102 to participant device 104 of a participant, and participant device 104 to which encoded conference video stream 120 is transmitted may be considered the participant associated with encoded video stream 406. On the other hand, in video conferencing system 150 based on the SFU architecture, encoded video stream 406 may be encoded participant video stream 110 transmitted from participant device 104 of a participant to video conference server 102, and participant device 104 that transmits encoded participant video stream 110 may be considered the participant device 104 associated with encoded video stream 406. Accordingly, the communication channel of participant device 104 associated with encoded video stream 406 may be the communication channel through which encoded video stream 406 is transmitted to and/or from participant device 104.

In some embodiments, to determine network condition 416 of the communication channel associated with encoded video stream 406, video conference management system 200 may receive packet statistic data from network communication units of video conference server 102 and participant device 104 that communicate encoded video stream 406 therebetween. The packet statistic data may specify one or more packets of encoded video stream 406 that are sent, one or more packets of encoded video stream 406 that are received, and/or one or more packets of encoded video stream 406 that are lost during the transmission of encoded video stream 406 between video conference server 102 and participant device 104 via the communication channel. In some embodiments, video conference management system 200 may analyze the packet statistic data to determine a number of packets lost and a number of packets expected, and calculate a ratio between the number of packets lost and a number of packets expected as a fractional packet loss. Video conference management system 200 may also analyze the packet statistic data to calculate a delay between arrival time of consecutive packets. In some embodiments, network condition 416 may include the fractional packet loss, the delay between arrival time of consecutive packets, and/or other metrics that indicate the network quality of the communication channel associated with encoded video stream 406. Thus, with network condition 416 being included in context data 410, the adjustment of encoded video streams 406 based on context data 410 may take into consideration network condition 416 of the communication channel through which encoded video streams 406 may be transmitted.

In some embodiments, to determine context data 410, video conference management system 200 may determine estimated bandwidth 418 of the communication channel associated with encoded video stream 406. Estimated bandwidth 418 may indicate an amount of available bandwidth of the communication channel through which encoded video streams 406 may be transmitted. In some embodiments, video conference management system 200 may calculate estimated bandwidth 418 of the communication channel based on network condition 416 of the communication channel. For example, estimated bandwidth 418 may be inversely proportional to the fractional packet loss and inversely proportional to the delay between arrival time of consecutive packets transmitted via the communication channel. Additionally or alternatively, video conference management system 200 may receive estimated bandwidth 418 of the communication channel from a bandwidth estimation device. In some embodiments, video conference management system 200 may use estimated bandwidth 418 included in context data 410 to determine a bitrate threshold for encoded video stream 406. For example, a total bitrate of one or more encoded video streams 406 that are transmitted through the communication channel may not exceed estimated bandwidth 418.

In some embodiments, to determine context data 410, video conference management system 200 may determine device capabilities 420 of the encoding device that encodes original video frames 510 of original real-time video stream 402 into encoded video frames 520 of encoded video stream 406. As described herein, in video conferencing system 100 based on the MCU architecture, original real-time video stream 402 may be conference video stream 120 generated and encoded by video conference server 102, and therefore video conference server 102 may be the encoding device. On the other hand, in video conferencing system 150 based on the SFU architecture, original real-time video stream 402 may be participant video stream 110 generated and encoded by participant device 104, and therefore participant device 104 may be the encoding device.

In some embodiments, device capabilities 420 may indicate various resources (e.g., computing resource, network resource, etc.) of the encoding device that can be used to generate and transmit encoded video streams 406. In some embodiments, video conference management system 200 may categorize the encoding device based on its device capabilities 420. For example, based on computing resource (e.g., processing speed, processing architecture, number of cores, etc.) of the encoding device, video conference management system 200 may classify the encoding device into a device category among a plurality of predefined device categories (e.g., a low-end category, a mid-range category, a high-end category). Video conference management system 200 may then use the device category of the encoding device to determine a highest video quality level (e.g., a highest video resolution and a highest frame rate) of encoded video streams 406 that can be generated by the encoding device.

In some embodiments, to determine context data 410, video conference management system 200 may determine device state 422 of the encoding device that encodes original video frames 510 of original real-time video stream 402 into encoded video frames 520 of encoded video stream 406. For example, video conference management system 200 may request device state 422 of the encoding device using a corresponding Application Programming Interface (API)

request associated with the encoding device. In some embodiments, device state 422 may indicate a current operation condition of the encoding device and may be used to adaptively adjust encoded video streams 406 generated by the encoding device. For example, device state 422 may indicate that a computer processing unit (CPU) usage of the encoding device is 75%. Thus, the CPU of the encoding device currently operates at 75% of its capacity. In this example, video conference management system 200 may determine that the CPU usage of the encoding device satisfies a CPU usage threshold (e.g., higher than 70%) and therefore determine that the video quality level (e.g., the video resolution and the frame rate) of encoded video streams 406 generated by the encoding device need to be lowered to avoid negative impacts on the operations and/or the lifetime of the encoding device.

In some embodiments, to determine context data 410, video conference management system 200 may determine meeting context 424 of the video conference meeting. For example, video conference management system 200 may obtain meeting context 424 of the video conference meeting from the video conferencing application.

In some embodiments, meeting context 424 may indicate one or more speaking statuses of one or more participants in the video conference meeting. The speaking status of a participant in the video conference meeting may indicate whether the participant is speaking to other participants (e.g., the participant is an active speaker) or listening to other participants without speaking (e.g., the participant is a passive listener). In some embodiments, meeting context 424 may also indicate one or more spotlight statuses of one or more participants in the video conference meeting. The spotlight status of a participant in the video conference meeting may indicate whether the participant is spotlighted by one or more other participants in the video conference meeting. If the participant is spotlighted by the one or more other participants, the one or more other participants may watch the participant instead of watching the active speaker of the video conference meeting.

In some embodiments, meeting context 424 may indicate importance levels of original real-time video streams 402 associated with participants of the video conference meeting. For a participant having the speaking status of "active speakers" and/or the spotlight status of "spotlighted," video conference management system 200 may determine that original real-time video stream 402 associated with the participant is relatively important and therefore may be encoded with relatively higher video quality level (e.g., higher video resolution and/or higher frame rate) as compared to other participants having the speaking status of "passive listeners" and/or the spotlight status of "non-spotlighted" in the video conference meeting.

Accordingly, context data 410 associated with encoded video frames 520 of encoded video stream 406 may describe a comprehensive context related to original real-time video stream 402 corresponding to encoded video stream 406. As described herein, context data 410 may include content attributes 412 and encoder metrics 414 that indicate the encoding complexity level of original real-time video stream 402, network condition 416 and estimated bandwidth 418 of the communication channel through which one or more encoded video streams 406 corresponding to original real-time video stream 402 may be transmitted, device capabilities 420 and device state 422 of the encoding device that encodes original real-time video stream 402 into one or more encoded video streams 406, and meeting context 424 indicating the speaking statuses and the spotlight statuses of participants in the video conference meeting. Other types of context data 410 are also possible and contemplated.

In some embodiments, when or after context data 410 is determined, video conference management system 200 may input context data 410 into a context analyzing module 430 of video conference management system 200 as depicted in FIGS. 4A-4C. In some embodiments, context analyzing module 430 may analyze context data 410 to generate one or more outputs that can be used to adjust one or more encoded video streams 406 corresponding to original real-time video stream 402.

A first implementation to adjust one or more encoded video streams 406 corresponding to original real-time video stream 402 based on context data 410 is illustrated in FIG. 4A. In some embodiments, to adjust one or more encoded video streams 406, context analyzing module 430 may determine, from one or more encoded video streams 406 corresponding to original real-time video stream 402, one or more first encoded video streams 406 and one or more second encoded video streams 406 based on context data 410. Each encoded video stream 406 among first encoded video streams 406 and second encoded video streams 406 may correspond to a particular video quality level with a particular video resolution and a particular frame rate. In some embodiments, context analyzing module 430 may generate output 432 specifying one or more first encoded video streams 406 and/or one or more second encoded video streams 406, and provide output 432 to a stream manager 434 as depicted in FIG. 4A.

In some embodiments, stream manager 434 may be implemented in video conference management system 200 and/or in the encoding device and/or in a separate computing system communicatively coupled to the encoding device. Stream manager 434 may be configured to manage encoded video streams 406 generated by video encoder 404 of the encoding device. As depicted in FIG. 4A, stream manager 434 may receive output 432 from context analyzing module 430. Based on output 432 that specifies one or more first encoded video streams 406 and/or one or more second encoded video streams 406, stream manager 434 may enable one or more first encoded video streams 406 and disable one or more second encoded video streams 406 for participant device 104 that is associated with encoded video stream 406 being used to determine context data 410 (also referred to herein as participant device 104 associated with context data 410). Accordingly, the encoding device may only transmit one or more first encoded video streams 406 as output encoded streams 436-1 . . . 436-m (commonly referred to herein as output encoded streams 436) for participant device 104 associated with context data 410 and may not transmit one or more second encoded video streams 406 for participant device 104 associated with context data 410.

As an example, in video conferencing system 100 based on the MCU architecture, original real-time video stream 402 may be conference video stream 120, the encoding device may be video conference server 102 that encodes conference video stream 120 into one or more encoded video streams 406, and participant device 104 associated with context data 410 may be participant device 104 that receives encoded video stream 406 being used to determine context data 410. In this example, video conference server 102 as the encoding device may only transmit one or more first encoded video streams 406 as output encoded streams 436 corresponding to conference video stream 120 to participant device 104 associated with context data 410, and may not transmit one or more second encoded video streams 406 to participant device 104 associated with context data 410.

As another example, in video conferencing system 150 based on the SFU architecture, original real-time video stream 402 may be participant video stream 110 of a participant, and the encoding device may be participant device 104 of the participant that encodes participant video stream 110 into one or more encoded video streams 406. As one or more encoded video streams 406 include encoded video stream 406 being used to determine context data 410, this participant device 104 may also be participant device 104 associated with context data 410. In this example, participant device 104 as the encoding device may only transmit one or more first encoded video streams 406 as output encoded streams 436 corresponding to participant video stream 110 to video conference server 102, and may not transmit one or more second encoded video streams 406 to video conference server 102.

In some embodiments, to determine one or more first encoded video streams 406 and one or more second encoded video streams 406 based on context data 410, context analyzing module 430 may implement a machine learning model. In some embodiments, the machine learning model may be subjected to a training process performed by a training system during which the machine learning model may learn to determine one or more first encoded video streams 406 and one or more second encoded video streams 406 based on context data 410.

In some embodiments, during the training process, the training system may provide the machine learning model with a plurality of training examples. Each training example may include context data associated with encoded video frames of an encoded video stream being transmitted in a video conference meeting. The training example may also specify one or more encoded video streams associated with the video conference meeting and a target output indicating one or more first encoded video streams actually being enabled for transmission and/or one or more second encoded video streams actually being disabled for transmission among the one or more encoded video streams associated with the video conference meeting.

In some embodiments, in a training cycle of the training process, the training system may input the context data included in the training example into the machine learning model. Based on the context data, the machine learning model may generate an output predicting one or more encoded video streams to be enabled for transmission and/or one or more encoded video streams to be disabled for transmission among the one or more encoded video streams associated with the video conference meeting. In some embodiments, the training system may determine a difference between the output generated by the machine learning model and the target output included in the training example, and generate a feedback value based on the difference between the generated output and the target output. The training system may then use the feedback value to adjust one or more model parameters of the machine learning model.

In some embodiments, the training system may determine whether the model parameters of the machine learning model are sufficiently adjusted. For example, the training system may determine that the machine learning model has been subjected to a predetermined number of training cycles. As another example, the training system may determine that the feedback value satisfies a predetermined feedback value threshold. As another example, the training system may determine that the feedback value remains substantially unchanged for a predetermined number of training cycles. Based on one or more of these determinations, the training system may determine that the model parameters of the machine learning model have been sufficiently adjusted. Accordingly, the training system may determine that the training process of the machine learning model is completed, and select the current values of the model parameters to be the values of the model parameters in the trained machine learning model.

In some embodiments, when the training process of the machine learning model is completed, the machine learning model may be deployed for context analyzing module 430 to determine one or more first encoded video streams 406 and one or more second encoded video streams 406 based on context data 410. For example, as depicted in FIG. 4A, video conference management system 200 may provide context data 410 as an input into context analyzing module 430 that implements the machine learning model, and receive from the machine learning model output 432 specifying one or more first encoded video streams 406 and/or one or more second encoded video streams 406. As described herein, context analyzing module 430 may provide output 432 to stream manager 434, and stream manager 434 may enable one or more first encoded video streams 406 and disable one or more second encoded video streams 406 for participant device 104 associated with context data 410 accordingly.

In some embodiments, in addition to or instead of implementing the machine learning model, context analyzing module 430 may implement one or more predefined rules for determining one or more first encoded video streams 406 and one or more second encoded video streams 406 based on context data 410. For example, the one or more predefined rules implemented by context analyzing module 430 may specify threshold values for various factors (e.g., the average SAD and the average macroblock variance in content attributes 412; the average QP value, the average encode time, the encoding mode distribution, etc., in encoder metrics 414; network condition 416; estimated bandwidth 418; device capabilities 420; device state 422; and/or meeting context 424) in context data 410. In some embodiments, if a particular encoded video stream 406 satisfies a predefined number of threshold values specified by the one or more predefined rules, context analyzing module 430 may identify the particular encoded video stream 406 as a first encoded video stream 406 to be enabled. Otherwise, context analyzing module 430 may identify the particular encoded video stream 406 as a second encoded video stream 406 to be disabled. Context analyzing module 430 may then generate output 432 accordingly.

A second implementation to adjust one or more encoded video streams 406 corresponding to original real-time video stream 402 based on context data 410 is illustrated in FIG. 4B. In some embodiments, to adjust one or more encoded video streams 406, context analyzing module 430 may determine one or more values for one or more encoder configuration parameters (e.g., target bitrate, QP value, encoding profile, etc.) of video encoder 404 based on context data 410. Context analyzing module 430 may then generate output 452 specifying the values for the encoder configuration parameters of video encoder 404, and provide output 452 to video encoder 404 as depicted in FIG. 4B.

In some embodiments, video encoder 404 may receive output 452 from context analyzing module 430 and set its encoder configuration parameters with the one or more values specified in output 452. As a result, when video encoder 404 uses the encoder configuration parameters to encode original real-time video stream 402 into encoded video streams 406, encoded video streams 406 generated by video encoder 404 may be adjusted accordingly.

In some embodiments, to determine the values for the encoder configuration parameters of video encoder 404 based on context data 410, context analyzing module 430 may implement a machine learning model. In some embodiments, the machine learning model may be subjected to a training process performed by a training system during which the machine learning model may learn to determine the values for the encoder configuration parameters of video encoder 404 based on context data 410.

In some embodiments, during the training process, the training system may provide the machine learning model with a plurality of training examples. Each training example may include context data associated with encoded video frames of an encoded video stream being transmitted in a video conference meeting. The training example may also specify a target output indicating actual values of the encoder configuration parameters of video encoder 404.

In some embodiments, in a training cycle of the training process, the training system may input the context data included in the training example into the machine learning model. Based on the context data, the machine learning model may generate an output predicting the values for the encoder configuration parameters of video encoder 404. In some embodiments, the training system may determine a difference between the output generated by the machine learning model and the target output included in the training example, and generate a feedback value based on the difference between the generated output and the target output. The training system may then use the feedback value to adjust one or more model parameters of the machine learning model.

In some embodiments, the training system may determine whether the model parameters of machine learning model are sufficiently adjusted. For example, the training system may determine that the machine learning model has been subjected to a predetermined number of training cycles. As another example, the training system may determine that the feedback value satisfies a predetermined feedback value threshold. As another example, the training system may determine that the feedback value remains substantially unchanged for a predetermined number of training cycles. Based on one or more of these determinations, the training system may determine that the model parameters of the machine learning model have been sufficiently adjusted. Accordingly, the training system may determine that the training process of the machine learning model is completed, and select the current values of the model parameters to be the values of the model parameters in the trained machine learning model.

In some embodiments, when the training process of the machine learning model is completed, the machine learning model may be deployed for context analyzing module 430 to determine one or more values for one or more encoder configuration parameters of video encoder 404 based on context data 410. For example, as depicted in FIG. 4B, video conference management system 200 may provide context data 410 as an input into context analyzing module 430 that implements the machine learning model, and receive from the machine learning model output 452 specifying the one or more values for the one or more encoder configuration parameters of video encoder 404. As described herein, context analyzing module 430 may provide output 452 to video encoder 404. Video encoder 404 may set one or more corresponding encoder configuration parameters with the one or more values specified in output 452, and apply the encoder configuration parameters to encode original real-time video stream 402.

In some embodiments, in addition to or instead of implementing the machine learning model, context analyzing module 430 may implement one or more predefined rules for determining values of encoder configuration parameters of video encoder 404 based on context data 410. In some embodiments, each predefined rule implemented by context analyzing module 430 may specify threshold values for various factors (e.g., the average SAD and the average macroblock variance in content attributes 412; the average QP value, the average encode time, the encoding mode distribution, etc., in encoder metrics 414; network condition 416; estimated bandwidth 418; device capabilities 420; device state 422; and/or meeting context 424) in context data 410. The predefined rule may also specify one or more pairs of value sets in which each pair includes a set of current values and a set of adjusted values for encoder configuration parameters of video encoder 404. Accordingly, when one or more threshold values set forth in the predefined rule for one or more factors in context data 410 are satisfied, context analyzing module 430 may obtain a set current values of the encoder configuration parameters with which video encoder 404 currently operates, and identify a set of adjusted values corresponding to the set of current values of the encoder configuration parameters using the predefined rule. Context analyzing module 430 may then include the set of adjusted values of the encoder configuration parameters in output 452.

As an example, context analyzing module 430 may analyze context data 410 associated with encoded video frames 520 of encoded video stream 406. Regarding content attributes 412 included in context data 410, context analyzing module 430 may determine that encoded video frames 520 have the average SAD less than 1. Regarding encoder metrics 414 included in context data 410, context analyzing module 430 may determine that encoded video frames 520 have less than 70% of macroblocks with the motion vector of zero value, less than 20% of macroblocks being encoded with the intra-frame mode, and less than 1% of motion vectors having large magnitude. Context analyzing module 430 may also determine that encoded video stream 406 are generated with the average QP value less than 22 and the average encode time less than 18 ms. Accordingly, context analyzing module 430 may determine that encoded video frames 520 satisfy corresponding threshold values set forth for these factors in a predefined rule.

As described herein, context analyzing module 430 may obtain a set of current values of encoder configuration parameters with which video encoder 404 currently operates. In this example, video encoder 404 may currently generate encoded video stream 406 with a video resolution of 640×360 and a frame rate of 30 fps. Context analyzing module 430 may reference the predefined rule and determine that the current video resolution and frame rate of video encoder 404 correspond to an adjusted video resolution of 1280×720. Accordingly, context analyzing module 430 may generate output 452 including the adjusted video resolution (e.g., 1280×720) and provide output 452 to video encoder 404. Upon receiving output 452, video encoder 404 may adjust the video resolution of encoded video streams 406 generated by video encoder 404 from 640×360 to 1280×720 and start encoding original video frames 510 of original real-time video stream 402 with the adjusted video resolution of 1280×720.

In some embodiments, the first implementation and the second implementation for adjusting one or more encoded video streams 406 corresponding to original real-time video stream 402 based on context data 410 may be deployed separately as depicted in FIGS. 4A and 4B. Alternatively, in other embodiments, the first implementation and the second implementation may be deployed in combination. For example, the machine learning model implemented by context analyzing module 430 may be trained to determine one or more first encoded video streams 406 and one or more second encoded video streams 406 based on context data 410 and also to determine one or more values for one or more encoder configuration parameters of video encoder 404 based on context data 410. Accordingly, when video conference management system 200 provides context data 410 as an input into context analyzing module 430 that implements the machine learning model, context analyzing module 430 may receive from the machine learning model a first output specifying one or more first encoded video streams 406 and/or one or more second encoded video streams 406. Context analyzing module 430 may also receive from the machine learning model a second output specifying the one or more values for the one or more encoder configuration parameters of video encoder 404. In this case, context analyzing module 430 may provide the first output to stream manager 434 and provide the second output to video encoder 404. As a result, video encoder 404 may adjust its encoder configuration parameters in generating encoded video streams 406 based on context data 410, and stream manager 434 may selectively enable one or more first encoded video streams 406 and disable one or more second encoded video streams 406 for transmission among encoded video streams 406 based on context data 410.

A third implementation to adjust one or more encoded video streams 406 corresponding to original real-time video stream 402 based on context data 410 is illustrated in FIG. 4C. In some embodiments, to adjust one or more encoded video streams 406, context analyzing module 430 may compute a stream score of original real-time video stream 402 based on context data 410, The stream score of original real-time video stream 402 may represent an encoding complexity level of original real-time video stream 402 and a feasibility level of video encoder 404 to encode original real-time video stream 402. Context analyzing module 430 may then generate output 472 specifying the stream score of original real-time video stream 402, and provide output 472 to video encoder 404 and/or stream manager 434 as depicted in FIG. 4C.

In some embodiments, video encoder 404 may receive output 472 from context analyzing module 430. Video encoder 404 may adjust its encoder configuration parameters based on the stream score of original real-time video stream 402 specified in output 472. For example, video encoder 404 may adjust its QP value to be proportional to the stream score of original real-time video stream 402. As a result, when video encoder 404 uses the encoder configuration parameters to encode original real-time video stream 402 into encoded video streams 406, encoded video streams 406 generated by video encoder 404 may be adapted to the stream score that reflects the encoding complexity level and the feasibility level associated with original real-time video stream 402.

In some embodiments, stream manager 434 may also receive output 472 from context analyzing module 430. Stream manager 434 may selectively enable one or more first encoded video streams 406 and disable one or more second encoded video streams 406 for transmission among encoded video streams 406 based on the stream score of original real-time video stream 402 specified in output 472. Accordingly, one or more first encoded video streams 406 may be transmitted for participant device 104 associated with context data 410 as one or more output encoded streams 474-1 . . . 474-*m* (commonly referred to herein as output encoded stream 474), and one or more second encoded video streams 406 may not be transmitted for participant device 104 associated with context data 410.

In some embodiments, to compute the stream score of original real-time video stream 402 based on context data 410, context analyzing module 430 may implement a machine learning model. In some embodiments, the machine learning model may be subjected to a training process performed by a training system during which the machine learning model may learn to compute the stream score of original real-time video stream 402 based on context data 410.

In some embodiments, during the training process, the training system may provide the machine learning model with a plurality of training examples. Each training example may include context data associated with encoded video frames of an encoded video stream being transmitted in a video conference meeting. The training example may also specify a target output indicating an actual stream score assigned to original real-time video stream 402.

In some embodiments, in a training cycle of the training process, the training system may input the context data included in the training example into the machine learning model. Based on the context data, the machine learning model may generate an output predicting the stream score of original real-time video stream 402. In some embodiments, the training system may determine a difference between the output generated by the machine learning model and the target output included in the training example, and generate a feedback value based on the difference between the generated output and the target output. The training system may then use the feedback value to adjust one or more model parameters of the machine learning model.

In some embodiments, the training system may determine whether the model parameters of machine learning model are sufficiently adjusted. For example, the training system may determine that the machine learning model has been subjected to a predetermined number of training cycles. As another example, the training system may determine that the feedback value satisfies a predetermined feedback value threshold. As another example, the training system may determine that the feedback value remains substantially unchanged for a predetermined number of training cycles. Based on one or more of these determinations, the training system may determine that the model parameters of the machine learning model have been sufficiently adjusted. Accordingly, the training system may determine that the training process of the machine learning model is completed, and select the current values of the model parameters to be the values of the model parameters in the trained machine learning model.

In some embodiments, when the training process of the machine learning model is completed, the machine learning model may be deployed for context analyzing module 430 to compute the stream score of original real-time video stream 402 based on context data 410. For example, as depicted in FIG. 4C, video conference management system 200 may provide context data 410 as an input into context analyzing module 430 that implements the machine learning model, and receive from the machine learning model output 472 specifying the stream score of original real-time video stream 402. Context analyzing module 430 may then provide output 472 to video encoder 404 and/or stream manager 434. As described herein, video encoder 404 may select values for one or more encoder configuration parameters based on the stream score of original real-time video stream 402 specified in output 472, and use the encoder configuration parameters to encode original real-time video stream 402. As described herein, stream manager 434 may selectively enable one or more first encoded video streams 406 and disable one or more second encoded video streams 406 for transmission among encoded video streams 406 based on the stream score of original real-time video stream 402 specified in output 472.

In some embodiments, in addition to or instead of implementing the machine learning model, context analyzing module 430 may implement one or more predefined rules for computing a stream score of original real-time video stream 402 based on context data 410. In some embodiments, each predefined rule implemented by context analyzing module 430 may specify threshold values for various factors in context data 410 (e.g., the average SAD and the average macroblock variance in content attributes 412; the average QP value, the average encode time, the encoding mode distribution, etc., in encoder metrics 414; network condition 416; estimated bandwidth 418; device capabilities 420; device state 422; and/or meeting context 424). The predefined rule may also specify a corresponding stream score of original real-time video stream 402. Accordingly, when one or more threshold values set forth in the predefined rule for one or more factors in context data 410 are satisfied, context analyzing module 430 may reference the predefined rule and obtain the stream score indicating the encoding complexity level of original real-time video stream 402 and a feasibility level of video encoder 404 to encode original real-time video stream 402. Context analyzing module 430 may then include the stream score of original real-time video stream 402 in output 472.

As an example, context analyzing module 430 may analyze context data 410 associated with encoded video frames 520 of encoded video stream 406. Regarding content attributes 412 included in context data 410, context analyzing module 430 may determine that encoded video frames 520 have the average SAD less than 1. Regarding encoder metrics 414 included in context data 410, context analyzing module 430 may determine that encoded video frames 520 have less than 70% of macroblocks with the motion vector of zero value, less than 20% of macroblocks being encoded with the intra-frame mode, and less than 1% of motion vectors having large magnitude. Context analyzing module 430 may also determine that encoded video stream 406 are generated with the average QP value less than 22 and the average encode time less than 18 ms. Accordingly, context analyzing module 430 may determine that encoded video frames 520 satisfy corresponding threshold values set forth for these factors in a predefined rule.

As described herein, context analyzing module 430 may reference the predefined rule and obtain the stream score of original real-time video stream 402. In this example, the stream score may be within a value range that corresponds to original real-time video stream 402 having a moderate-to-low encoding complexity level and video encoder 404 having a moderate feasibility level to encode original real-time video stream 402. Context analyzing module 430 may then generate output 472 including the stream score of original real-time video stream 402 and provide output 472 to video encoder 404 and/or stream manager 434. Upon receiving output 472, video encoder 404 may adjust one or more encoder configuration parameters of video encoder 404 based on the stream score of original real-time video stream 402, and use the adjusted encoder configuration parameters to encode original real-time video stream 402 as described herein, Stream manager 434 may selectively enable one or more first encoded video streams 406 and disable one or more second encoded video streams 406 for transmission among encoded video streams 406 based on the stream score of original real-time video stream 402 as described herein.

In some embodiments, video conferencing system (e.g., systems 100 and 150) described herein may be implemented in one or more computing systems that have a large amount of resources such as a multi-access edge computing (MEC) server and may be coupled to a communication network that has high throughput and low latency such as a 5G network. Accordingly, computing devices (e.g., video conference server 102, participant devices 104, etc.) in the video conferencing system may be capable of applying sophisticated encoding algorithms to encode original real-time video stream 402. For example, video conference server 102 and/or participant devices 104 may use an optical flow algorithm to perform motion estimation in encoding original real-time video stream 402 into encoded video streams 406.

Similarly, video conference management system 200 may also be implemented in one or more computing systems that have a large amount of resources such as a MEC server and may be coupled to a communication network that has high throughput and low latency such as a 5G network. Accordingly, due to its large amount of computing resources, video conference management system 200 may be capable of personalizing the model parameters of one or more machine learning models implemented by context analyzing module 430 of video conference management system 200. As an example, for each ongoing video conference meeting, video conference management system 200 may receive participant data of participants in the video conference meeting. The participant data of a participant may indicate a geographical location from which the participant participates in the video conference meeting, a device type of a participant device 104 through which the participant participates in the video conference meeting, a behavior pattern of the participant when participating in various video conference meetings, etc.

In some embodiments, video conference management system 200 may analyze the participant data of the participants in the video conference meeting as the video conference meeting is initiated or in progress, and adjust the model parameters of the one or more machine learning models implemented by context analyzing module 430 based on the participant data. As a result, the machine learning models may be customized specifically for the video conference meeting and participants of the video conference meeting, and therefore the accuracy of the machine learning model in generating the output (e.g., the encoded video stream selection, the encoder configuration parameter, the stream score) described herein may be improved.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 6:
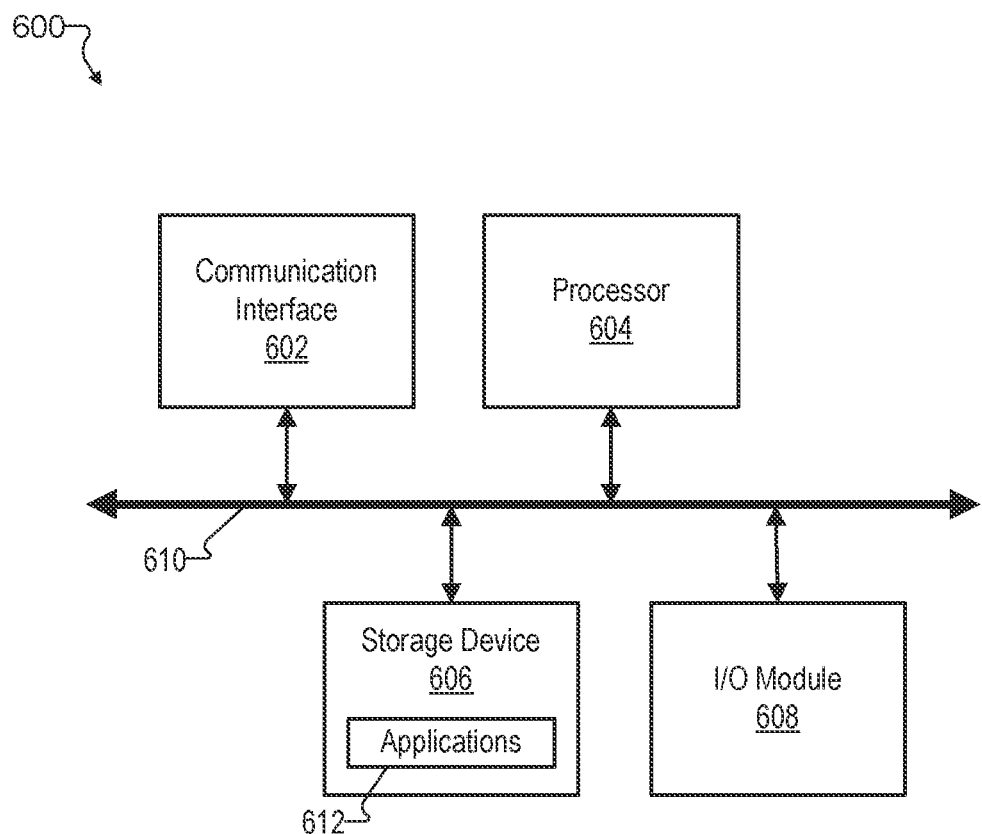
FIG. 6 shows an illustrative computing device according to embodiments described herein.

FIG. 6 shows an illustrative computing device 600 that may be specifically configured to perform one or more of the processes described herein. For example, computing device 600 may include or implement (or partially implement) a video conferencing system such as systems 100 and 150, a video conference management system such as system 200, and/or any other computing devices described herein.

As shown in FIG. 6, computing device 600 may include a communication interface 602, a processor 604, a storage device 606, and an input/output ("I/O") module 608 communicatively connected via a communication infrastructure 610. While an illustrative computing device 600 is shown in FIG. 6, the components illustrated in FIG. 6 are not intended to be limiting. Additional or alternative components may be used in other embodiments. Components of computing device 600 shown in FIG. 6 will now be described in additional detail.

Communication interface 602 may be configured to communicate with one or more computing devices. Examples of communication interface 602 include, without limitation, a wired network interface (such as a network interface card), a wireless network interface (such as a wireless network interface card), a modem, an audio/video connection, and any other suitable interface.

Processor 604 generally represents any type or form of processing unit capable of processing data or interpreting, executing, and/or directing execution of one or more of the instructions, processes, and/or operations described herein. Processor 604 may direct execution of operations in accordance with one or more applications 612 or other computer-executable instructions such as may be stored in storage device 606 or another computer-readable medium.

Storage device 606 may include one or more data storage media, devices, or configurations and may employ any type, form, and combination of data storage media and/or device. For example, storage device 606 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 606. For example, data representative of one or more executable applications 612 configured to direct processor 604 to perform any of the operations described herein may be stored within storage device 606. In some examples, data may be arranged in one or more databases residing within storage device 606.

I/O module 608 may include one or more I/O modules configured to receive user input and provide user output. One or more I/O modules may be used to receive input for a single virtual experience. I/O module 608 may include any hardware, firmware, software, or combination thereof supportive of input and output capabilities. For example, I/O module 608 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 608 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 608 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 600. For example, one or more applications 612 residing within storage device 606 may be configured to direct processor 604 to perform one or more processes or functions associated with processor 204 of video conference management system 200. Likewise, memory 202 of video conference management system 200 may be implemented by or within storage device 606.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various illustrative embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense,

What is claimed is:

1. A method comprising:
    monitoring, by a video conference management system, an encoded video stream corresponding to an original real-time video stream of a video conference meeting;
    determining, by the video conference management system, context data associated with one or more encoded video frames of the encoded video stream, the context data including at least one of an encoder metric or a content attribute that indicates an encoding complexity level of the original real-time video stream, wherein:
the one or more encoded video frames includes a first encoded video frame at a first timestamp and a second encoded video frame at a second timestamp subsequent to the first timestamp; and
the encoder metric is computed using a first weight value associated with the first encoded video frame and a second weight value associated with the second encoded video frame, the second weight value being higher than the first weight value; and
adjusting, by the video conference management system, one or more encoded video streams corresponding to the original real-time video stream based on the context data.

2. The method of claim 1, wherein:
the one or more encoded video frames corresponds to a past time window that consecutively precedes an original video frame being encoded at a current timestamp.

3. The method of claim 1, wherein the determining of the context data associated with the one or more encoded video frames includes:
determining the content attribute of one or more original video frames corresponding to the one or more encoded video frames; and
determining the encoder metric associated with one or more encoding operations of a video encoder to encode the one or more original video frames into the one or more encoded video frames.

4. The method of claim 1, wherein the content attribute comprises one or more of:
an average sum of absolute differences (SAD) between two consecutive original video frames among one or more original video frames corresponding to the one or more encoded video frames; or
an average macroblock variance of an original video frame among the one or more original video frames.

5. The method of claim 1, wherein the encoder metric comprises one or more of:
an average quantization parameter (QP) value associated with the one or more encoded video frames;
an average encode time associated with the one or more encoded video frames;
an encoding mode distribution associated with the one or more encoded video frames;
an average ratio between an average number of bits in one or more intra-frames (I frames) within a predefined time period and an average number of bits in one or more inter-frames (P frames) within the predefined time period; or
an average difference between a target bitrate and an output bitrate of a video encoder that encodes one or more original video frames into the one or more encoded video frames.

6. The method of claim 1, wherein:
the encoded video stream generated by a video encoder implemented on an encoding device; and
the context data further comprises one or more of a network condition of a communication channel associated with the encoded video stream, an estimated bandwidth of the communication channel, a device capability of the encoding device, or a device state of the encoding device.

7. The method of claim 1, wherein:
the context data further comprises a meeting context of the video conference meeting, the meeting context indicating a speaking status of one or more participants of the video conference meeting or a spotlight status of the one or more participants.

8. The method of claim 1, wherein the adjusting of the one or more encoded video streams corresponding to the original real-time video stream includes:
determining, from the one or more encoded video streams corresponding to the original real-time video stream and based on the context data, a first encoded video stream corresponding to a first video quality level and a second encoded video stream corresponding to a second video quality level; and
enabling the first encoded video stream and disabling the second encoded video stream for a participant device associated with the encoded video stream.

9. The method of claim 8, wherein the determining of the first encoded video stream and the second encoded video stream includes:
providing the context data as an input into a machine learning model; and
receiving, from the machine learning model, an output specifying at least one of the first encoded video stream or the second encoded video stream.

10. The method of claim 1, wherein the adjusting of the one or more encoded video streams corresponding to the original real-time video stream includes:
adjusting, based on the context data, an encoder configuration parameter of a video encoder that encodes the original real-time video stream.

11. The method of claim 10, wherein the adjusting of the encoder configuration parameter of the video encoder includes:
providing the context data as an input into a machine learning model; and
receiving, from the machine learning model, an output specifying a value of the encoder configuration parameter.

12. The method of claim 1, wherein the adjusting of the one or more encoded video streams corresponding to the original real-time video stream includes:
providing the context data as an input into a machine learning model;
receiving, from the machine learning model, a stream score representing the encoding complexity level of the original real-time video stream and a feasibility level of an encoding device to encode the original real-time video stream; and
adjusting the one or more encoded video streams corresponding to the original real-time video stream based on the stream score.

13. A system comprising:
a memory storing instructions; and
a processor communicatively coupled to the memory and configured to execute the instructions to:
monitor an encoded video stream corresponding to an original real-time video stream of a video conference meeting;
determine context data associated with one or more encoded video frames of the encoded video stream, the context data including at least one of an encoder metric or a content attribute that indicates an encoding complexity level of the original real-time video stream; and
adjust one or more encoded video streams corresponding to the original real-time video stream based on the context data; wherein the adjusting of the one or more encoded video streams corresponding to the original real-time video stream includes:

providing the context data as an input into a machine learning model;

receiving, from the machine learning model, a stream score representing the encoding complexity level of the original real-time video stream and a feasibility level of an encoding device to encode the original real-time video stream; and adjusting the one or more encoded video streams corresponding to the original real-time video stream based on the stream score.

14. The system of claim 13, wherein:
the one or more encoded video frames corresponds to a past time window that consecutively precedes an original video frame being encoded at a current timestamp.

15. The system of claim 13, wherein the determining of the context data associated with the one or more encoded video frames includes:
determining the content attribute of one or more original video frames corresponding to the one or more encoded video frames; and
determining the encoder metric associated with one or more encoding operations of a video encoder to encode the one or more original video frames into the one or more encoded video frames.

16. The system of claim 13, wherein the adjusting of the one or more encoded video streams corresponding to the original real-time video stream includes:
determining, from the one or more encoded video streams corresponding to the original real-time video stream and based on the context data, a first encoded video stream corresponding to a first video quality level and a second encoded video stream corresponding to a second video quality level; and
enabling the first encoded video stream and disabling the second encoded video stream for a participant device associated with the encoded video stream.

17. The system of claim 13, wherein the adjusting of the one or more encoded video streams corresponding to the original real-time video stream includes:
adjusting, based on the context data, an encoder configuration parameter of a video encoder that encodes the original real-time video stream.

18. A non-transitory computer-readable medium storing instructions that, when executed, direct a processor of a video conference management system to:
monitor an encoded video stream corresponding to an original real-time video stream of a video conference meeting;
determine context data associated with one or more encoded video frames of the encoded video stream, the context data including at least one of an encoder metric or a content attribute that indicates an encoding complexity level of the original real-time video stream; and
adjust one or more encoded video streams corresponding to the original real-time video stream based on the context data, wherein the adjusting of the one or more encoded video streams corresponding to the original real-time video stream includes:
determining, from the one or more encoded video streams corresponding to the original real-time video stream and based on the context data, a first encoded video stream corresponding to a first video quality level and a second encoded video stream corresponding to a second video quality level; and
enabling the first encoded video stream and disabling the second encoded video stream for a participant device associated with the encoded video stream.

19. The non-transitory computer-readable medium of claim 18, wherein:
the one or more encoded video frames includes a first encoded video frame at a first timestamp and a second encoded video frame at a second timestamp subsequent to the first timestamp; and
the encoder metric is computed using a first weight value associated with the first encoded video frame and a second weight value associated with the second encoded video frame, the second weight value being higher than the first weight value.

20. The non-transitory computer-readable medium of claim 18, wherein the adjusting of the one or more encoded video streams corresponding to the original real-time video stream further includes:
providing the context data as an input into a machine learning model;
receiving, from the machine learning model, a stream score representing the encoding complexity level of the original real-time video stream and a feasibility level of an encoding device to encode the original real-time video stream; and
adjusting the one or more encoded video streams corresponding to the original real-time video stream based on the stream score.

* * * * *